US012126177B2

(12) United States Patent
Lee et al.

(10) Patent No.: US 12,126,177 B2
(45) Date of Patent: Oct. 22, 2024

(54) SOLAR POWER SYSTEM FOR INDUCTION MOTOR SOFT-STARTING AND POWER COMPENSATION, AND RELATED METHODS

(71) Applicant: BOARD OF TRUSTEES OF MICHIGAN STATE UNIVERSITY, East Lansing, MI (US)

(72) Inventors: Woongkul Lee, Okemos, MI (US); Younsuk Dong, Okemos, MI (US); Musab Guven, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 18/565,574

(22) PCT Filed: Jul. 7, 2023

(86) PCT No.: PCT/US2023/027074
§ 371 (c)(1),
(2) Date: Nov. 30, 2023

(87) PCT Pub. No.: WO2024/010894
PCT Pub. Date: Jan. 11, 2024

(65) Prior Publication Data
US 2024/0266836 A1 Aug. 8, 2024

Related U.S. Application Data

(60) Provisional application No. 63/359,539, filed on Jul. 8, 2022.

(51) Int. Cl.
*H02J 3/38* (2006.01)
*H02M 7/537* (2006.01)

(52) U.S. Cl.
CPC ............... *H02J 3/38* (2013.01); *H02M 7/537* (2013.01); *H02J 2300/24* (2020.01)

(58) Field of Classification Search
CPC ......... H02J 3/38; H02J 2300/24; H02M 7/537
See application file for complete search history.

(56) References Cited

U.S. PATENT DOCUMENTS

2020/0177110 A1   6/2020   Milivojevic et al.
2021/0099109 A1   4/2021   Milivojevic et al.
(Continued)

OTHER PUBLICATIONS

International Application No. PCT/US2023/027074, International Search Report and Written Opinion, mailed Oct. 12, 2023.
(Continued)

*Primary Examiner* — Robert L Deberadinis
(74) *Attorney, Agent, or Firm* — MARSHALL, GERSTEIN & BORUN LLP

(57) ABSTRACT

The disclosure relates to a solar power system for induction motor soft-starting and power compensation. The system includes an induction motor, a solar microinverter, and a relay system electrically coupling the induction motor and the solar microinverter to a power grid or line power supply. The relay system can operate in a soft-start state using solar power to start the induction motor with reduced peaks/transient behaviors, a continuous operation state using power grid line active power with reactive power compensation from the solar microinverter, and a renewable energy generation state using the solar microinverter to feed solar energy to the power grid when the induction motor is not in use.

21 Claims, 9 Drawing Sheets

(56) References Cited

U.S. PATENT DOCUMENTS

| | | |
|---|---|---|
| 2021/0376613 A1 | 12/2021 | Cummings |
| 2022/0077688 A1 | 3/2022 | Patarroyo et al. |
| 2022/0209713 A1 | 6/2022 | Salari et al. |

OTHER PUBLICATIONS

Guven et al., Shunt-Connected Solar Microinverter for Induction Motor Soft-Starting and Active and Reactive Power Compensation, 2022 IEEE Energy Conversion Congress and Exposition (Oct. 9-13, 2022).

SOLAR POWER SYSTEM FOR INDUCTION MOTOR SOFT-STARTING AND POWER COMPENSATION, AND RELATED METHODS

CROSS REFERENCE TO RELATED APPLICATION

This application is a US national stage of International Application No. PCT/US2023/027074, filed Jul. 7, 2023, which claims priority to U.S. Provisional Application No. 63/359,539 entitled "Solar Power System for Induction Motor Soft-Starting and Power Compensation, and Related Methods," filed on Jul. 8, 2023, which is incorporated herein by reference in its entirety.

STATEMENT OF GOVERNMENT INTEREST

None.

BACKGROUND OF THE DISCLOSURE

Field of the Disclosure

The disclosure relates to a solar power system for induction motor soft-starting and power compensation. The system includes an induction motor, a solar microinverter, and a relay system electrically coupling the induction motor and the solar microinverter to a power grid or line power supply in a plurality of different states for induction motor soft-starting, continuous motor operation with reactive power compensation, and renewable energy generation.

Background of the Disclosure

The heart of most agriculture irrigation systems is a pump which should be appropriately selected to match the requirement of the water source, distribution system, and irrigation equipment. It is estimated that 75% of the current irrigation pump systems are generally oversized by more than 20% to operate over a wide range of flow rates and pressures (USDA NRCS, 2010).

Many, if not most, existing irrigation pumps are driven by power grid-connected induction motors which may suffer from high starting current, low power factor, and low energy efficiency, any of which may lead to power grid instability and/or inadequate hydraulic performance. For example, a 10 horsepower (hp) induction motor-driven pump may include a nominal power factor of 0.89 and may require 7 kilowatts (kW) of active power and 3.84 kilovolt-amperes reactive (kVAr) of reactive power for the rated operation. The reactive power of 3.84 kVAr may be required to simply produce rotor magnetic flux in the motor, and may continuously circulate between the power grid and the induction motor, generating extra joule losses in the system in the process. Additionally, increasing demand for reactive power when accounting for an associated load on the motor may adversely affect the power grid operation, leading to poor power quality such as voltage sag, flicker, brownout, blackout, and/or other issues.

Using variable speed drives (VFDs) in water pumping systems may provide an opportunity to more accurately match an irrigation pump system to actual system requirements, which may beneficially reduce energy usage, reduce associated energy costs, and/or reduce water usage. A VFD may provide high efficiency, soft-starting (preventing water hammer and high-pressure damage to the valve, pipe, and pump of an irrigation system), and/or monitoring capabilities for an irrigation system. For example, the availability of microprocessors and bus communication options in a VFD, combined with current and voltage sensors may allow for monitoring of the same. Moreover, additional sensors such as vibration and pressure sensors may be connected to the drive, allowing the VFD to act as a smart sensor for condition monitoring. However, a full-size VFD may be cost-prohibitive for small and/or organic farmers, as a full-size VFD may require a full-size back-to-back inverter system, including rectification stage which may increase the cost of the VFD. Moreover, a VFD which may be connected in series to one or more induction motors which may no longer be in operation (i.e., to power an irrigation pump) once the irrigation season is over, resulting in inefficient utilization of a VFD. Even absent these considerations, by some estimates there are approximately 20 times more fixed-speed (grid-connected) pumps in service than those that are supplied new every year, such that replacing existing fixed-speed systems with VFDs would involve a significant time, resource, and/or financial investment.

SUMMARY

The disclosed devices, systems and methods address the shortcomings of grid-connected, fixed-speed induction motors when retrofitting such conventional systems with a solar power system.

In one aspect, the disclosure relates to a solar power system for induction motor soft-starting and power compensation, the system comprising: an induction motor (or alternatively/more generally an asynchronous machine or a line-started electric machine in place of the induction motor); a solar microinverter adapted to provide an AC power output from incident (or received) solar radiation, the AC power output comprising photovoltaic reactive power ($Q_{PV}$) and optionally photovoltaic active power ($P_{PV}$); and a relay system electrically coupled to the induction motor, the solar microinverter, and a power grid access point adapted to provide an AC power comprising grid reactive power ($Q_G$) and grid active power ($P_G$), wherein the relay system is adapted or configured to operate in (e.g., by electrically, electronically, or mechanically switching between) at least a first state, a second state, a third state, and optionally a fourth state. The induction motor more generally can be a line-starting or self-starting AC electric motor with an induction-driven rotor/stator structure, for example coupled to or incorporated in a (mechanical) machine driven by same. The power grid access point can represent any source of grid or line power to which the solar power system (e.g., induction motor, solar microinverter, and relay system) is connected (e.g., where the power grid itself is not a component of the solar power system).

In the first state of the relay system, the induction motor and the solar microinverter are in electrical connection (or electrical communication), the induction motor and the power grid access point (or power grid) are in electrical isolation, and the solar microinverter and the power grid access point (or power grid) are in electrical isolation.

In the second state of the relay system, the induction motor, the solar microinverter, and the power grid access point (or power grid) are in electrical connection (or electrical communication) with each other. The second state may provide continuous motor operation primarily powered by line power, but including peak shaving (i.e., leveling out peaks in the electricity used) and/or (reactive) power compensation from the solar microinverter.

In the third state of the relay system, the induction motor and the solar microinverter are in electrical isolation, the induction motor and the power grid access point (or power grid) are in electrical isolation, and the solar microinverter and the power grid access point (or power grid) are in electrical connection (or electrical communication). The third state may provide for renewable energy generation during motor downtime and/or during the motor off-season.

In the fourth state of the relay system, the induction motor, the solar microinverter, and the power grid access point (or power grid) are in electrical isolation with each other. The fourth state may provide for an initial idle or "off" state of the motor.

The solar microinverter generally may include (i) one or more solar panels or photovoltaic (PV) cells to receive incident sunlight/solar radiation and provide a corresponding DC power output, electrically coupled to (ii) a three-phase microinverter and line filter (e.g., LC or LCL filter) to provide a corresponding AC power output from the incident sunlight/solar radiation. The solar microinverter generally provides an amount of active power ($P_{PV}$) that is proportional to intensity of sunlight/solar radiation and reactive power ($Q_{PV}$) matching that of the induction motor. Thus, even when sunlight/solar radiation is low, the solar microinverter can still provide benefits of soft-starting, peak load shaving, and reactive power compensation for an otherwise line- or grid-powered induction motor.

As used herein, "electrically coupled" represents direct or indirect wiring or other electrical couplings (or connections) between different components, which couplings may or may not allow flow of electrical current in a given operational state of the system, for example due to the presence of an electrical switch or other structure that can be in an open (or disengaged; no current flow) or closed (or engaged; allowing current flow) state. Similarly as used herein, "electrical connection" (or alternatively "electrical communication") represents as a more specific state in which electrical current can flow between two components, and "electrical isolation" represents a state in which electrical current cannot flow between two components (e.g., due to the given state of electrical switch(es) in a corresponding operational state of the system).

Various refinements of the disclosed systems are possible.

In a refinement, the induction motor is coupled to a (mechanical) machine selected from the group consisting of pumps (e.g., irrigation pump), HVAC (heating, ventilation, air conditioning) systems or components thereof, dryers (e.g., grain dryer), fans, and combinations thereof (e.g., a motor driving multiple different machines). In some alternative aspects of the solar power system, the induction motor can be replaced with an asynchronous machine or a line-started electric machine.

In a refinement, the induction motor is coupled to a pump, for example a pump incorporating the induction motor as a component thereof. In a further refinement, the pump can be coupled to an agricultural irrigation system, for example including one or more of a reservoir or other water source, tubes/pipes for water transport and delivery, spray nozzles for application of water to an agricultural field, etc.

In a refinement, the induction motor has power rating in a range of about 3.7 kW to 45 kW or 76 kW (or about 5 hp to 60 hp or 100 hp). In a refinement, the solar microinverter comprises: one or more photovoltaic (PV) cells adapted to provide a DC output power of about 3 kW (e.g., up to about 100 ft$^2$ or about 9.3 m$^2$ of conventional solar panels to provide desired output power under normal sunlight conditions in a given area); and a microinverter adapted to provide an AC output power of about 5 kVA. The foregoing ranges represent typical useful working ranges in an agricultural setting when the solar power system is coupled to an agricultural irrigation pump. More generally, the induction motor can have any desired power rating depending on the device(s) to be driven by the motor, and the corresponding solar microinverter components can be scaled (e.g., with a plurality of PV cells and/or microinverter units in parallel) accordingly. For example, the induction motor can have power rating of at least 0.1, 0.2, 0.5, 1, 2, 5, 10, 20, or 50 kW and/or up to 1, 2, 5, 10, 20, 50, 100, or 200 kW. Similarly, the PV cells can be adapted to provide a DC output power of at least 0.1, 0.2, 0.5, 1, 2, 5, 10, 20, or 50 kW and/or up to 1, 2, 5, 10, 20, 50, 100, or 200 kW. Alternatively or additionally, the PV cells adapted to provide a DC output power of at least 0.1, 0.2, 0.5, 1, 2, 5, 10, 20, or 50 kVA and/or up to 1, 2, 5, 10, 20, 50, 100, or 200 kVA.

In a refinement, the relay system comprises: a point of common coupling (PCC) to which each of the induction motor, solar microinverter, and the power grid access point (or power grid) are electrically coupled; a first switch (or set of switches) electrically coupled to the PCC and the induction motor such that (i) the PCC and the induction motor are in electrical connection when the first switch is closed (or engaged), and (ii) the PCC and the induction motor are electrically isolated when the first switch is open (or disengaged); a second switch (or set of switches) electrically coupled to the PCC and the power grid such that (i) the PCC and the power grid access point (or power grid) are in electrical connection when the second switch is closed (or engaged), and (ii) the PCC and the power grid access point (or power grid) are electrically isolated when the second switch is open (or disengaged); and optionally a third switch (or set of switches) electrically coupled to the PCC and the solar microinverter such that (i) the PCC and the solar microinverter are in electrical connection when the third switch is closed (or engaged), and (ii) the PCC and the solar microinverter are electrically isolated when the third switch is open (or disengaged). This represents a Y- (or wye-) configuration. In the first state of the relay system, the first switch is closed and the second switch is open. In the second state of the relay system, the first switch is closed and the second switch is closed. In the third state of the relay system, the first switch is open and the second switch is closed. In the fourth state of the relay system, the first switch is open and the second switch is open.

In a refinement, the relay system comprises: a first switch (or set of switches) electrically coupled to the solar microinverter and the induction motor such that (i) the solar microinverter and the induction motor are in electrical connection when the first switch is closed (or engaged), and (ii) the solar microinverter and the induction motor are electrically isolated when the first switch is open (or disengaged); a second switch (or set of switches) electrically coupled to the induction motor and the power grid access point (or power grid) such that (i) the induction motor and the power grid access point (or power grid) are in electrical connection when the second switch is closed (or engaged), and (ii) the induction motor and the power grid access point (or power grid) are electrically isolated when the second switch is open (or disengaged); and a third switch (or set of switches) electrically coupled to the power grid access point (or power grid) and the solar microinverter such that (i) the power grid access point (or power grid) and the solar microinverter are in electrical connection when the third switch is closed (or engaged), and (ii) the power grid access point (or power grid) and the solar microinverter are electrically isolated when the third switch is open (or disengaged). This represents a Δ- (or delta-) configuration. In the first state of the relay system, the first switch is closed and the second/third switches are open. In the second state of the relay system, any two switches are closed. In the third state of the relay system, the first/second switches are open and the third switch is closed. In the fourth state of the relay system, at least two switches are open. This particular relay configuration is beneficial because it limits losses by connecting any two components through only one set of switches (i.e., in contrast to the Y-configuration where some relay states connect two components through two sets of switches).

In a refinement, the system further comprises a computer system (e.g., processor, memory, software) in electronic communication (e.g., wired or wireless communication for electronica data transfer) with one or more of the induction motor, the solar microinverter, and the relay system, the computer system being adapted to control and/or monitor operation of the induction motor, the solar microinverter, and/or the relay system. The computer system can be a dedicated system installed with/wired to one or more solar power system components. The computer system also can be a remote system operating on a computer, server, smartphone, or other mobile device wirelessly connected to one or more solar power system components (e.g., further including a wireless transceiver or other wireless communication hardware in the solar power system). The computer system can control operation of the solar power system components, such as powering the induction motor on/off, powering the solar microinverter on/off, controlling voltage and/or frequency delivered by the solar microinverter (e.g., for a soft-start using V/Hz control), switching the relay system between its various states, etc. The computer system can monitor, record, store, and/or transmit transient operational characteristics of the solar power system, such current in various system components, active and reactive power supplied or received by various system components, motor speed, water pressure in a pump or corresponding water line coupled to the induction motor, etc.

In another aspect, the disclosure relates to a method of operating a solar power system, the method comprising: operating a solar power system according to any of the variously disclosed embodiments, refinements, etc. with the relay system in the second state to power the induction motor, such that (i) at least some reactive power required by the induction motor is provided by the solar microinverter, and (ii) active power required by the induction motor is provided by the solar microinverter and the power grid (or through the power grid access point) combined. In a refinement, all reactive power required by the induction motor is provided by the solar microinverter. In a further refinement, at least some active power required by the induction motor is provided by the solar microinverter (e.g., where the remaining active power demand of the induction motor is provided by the power grid).

In another aspect, the disclosure relates to a method of operating a solar power system, the method comprising: operating a solar power system according to any of the variously disclosed embodiments, refinements, etc. with the relay system in the third state to provide power from the solar microinverter to a power grid through the power grid access point. This can represent a continuous off-season use of the solar power system to provide renewable energy to the power grid.

Various refinements of the disclosed methods are possible.

In a refinement, the method further comprises, prior to operating the solar power system with the relay system in the second state: operating the solar power system with the relay system in the first state to perform a soft-start process for the induction motor, the soft-start process comprising: operating the operating the solar power system with the relay system in the first state with the solar microinverter providing reactive power and active power to the induction motor to engage (or start) the induction motor, for example to achieve a steady state with respect to one or more of induction motor inertia, induction motor stator current, induction motor rotor current, and solar microinverter current. The end or target state of the soft-start process can be characterized by a (quasi) steady state of the induction motor so that it is ready to switch from the soft start mode to power grid mode with reactive compensation with minimal/reduced current spikes (i.e., reflecting a peak shaving benefit). For example, in a typical direct on-line start, motor torque is initially high and not constant. In contrast, using the disclosed solar power system and soft-start process, motor torque is generally constant and motor speed steadily increases during the soft-start. For instance, given an induction motor with a given rated speed (e.g., a constant or target rotational speed at steady or final operation), the soft-start process can be performed until motor speed is within 1, 2, 3, 5, 7, or 10% of the rated speed (e.g., at least 90, 93, 95, 97, 98, or 99% and/or up to 100% of the rated speed).

In a further refinement of the soft-start process, prior to operating the solar power system with the relay system in the first state, the induction motor is in a stationary state (e.g., idle or off state, such with the relay system in the fourth state).

In a further refinement of the soft-start process, operating the operating the solar power system with the relay system in the first state comprises performing a V/Hz control process for power provided by the solar microinverter to the induction motor, the V/Hz control process comprising: ramping a voltage of the power provided by the solar microinverter from zero to a selected setpoint voltage (e.g., matching voltage of AC power to be provided by power grid, such as 240 Vrms); ramping a frequency of the power provided by the solar microinverter from zero to a selected setpoint frequency (e.g., matching frequency of AC power to be provided by power grid, such as 60 Hz); and synchronizing the power provided by the solar microinverter with power provided by the power grid or through the power grid access point (e.g., phase- or angle-matching the AC power output by the solar microinverter to that of the AC power to be provided by power grid when switching from the soft-start process to a continuous operation stage).

In a further refinement of the soft-start process, the soft-start process further comprises (temporarily) disengaging the solar microinverter (i) after operating the solar power system with the relay system in the first state and (ii) before operating the solar power system with the relay system in the second state. Disengaging the solar microinverter can represent a brief transition between the soft-start process (e.g., relay system first state or mode 2) and the continuous operation state (e.g., relay system first state or mode 3) in which the solar microinverter is in an idle state (e.g., relay system fourth state or mode 1), for example being powered off and/or with corresponding switches being disengaged. This short disengaged transition state can minimize power spikes, current spikes, pressure spikes, or other undesired (initial) transient behavior when switching to direct on-line power for the continuous operation state. This disengaged transition state can be characterized by a controlled/selectable deadtime parameter (e.g., the time interval between one relay turning off and the other relay turning on), which is suitably less than one electrical cycle, which is about 16.7 ms at 60 Hz (e.g., at least 1, 2, or 5 ms and/or up to 4, 6, 8, 10, 12, or 15 ms; at least 2, 5, 10, or 20% and/or up to 35, 50, 70, 80, 90, or 95% of the electrical cycle).

In a further refinement of the soft-start process, the induction motor is coupled to a pump coupled to an agricultural irrigation system; and a peak pressure in a fluid (e.g., liquid water) irrigation line of the agricultural irrigation system is reduced relative to a corresponding peak pressure resulting from direct on-line starting of the induction motor from the power grid access point (e.g., in the absence of the solar microinverter and a corresponding soft-start process). This represents a benefit of the system in which less mechanical stress and/or damage is imposed on the motor, pump, and/or irrigation delivery tubing/piping by avoiding pressure spikes otherwise resulting from a direct on-line start. For example, any initial pressure peak observed after switching from the soft-start process is suitably within 2, 5, 10, 15, 20, or 25% of the steady or target irrigation line pressure during continuous pump operation (e.g., not more than 102, 105,110, 115, 118, 120, or 125% of the steady or target pressure).

In a further refinement of the soft-start process, a peak current in one or more of rotor current, stator current, and PV inverter current is reduced relative to a corresponding peak current resulting from direct on-line starting of the induction motor from the power grid access point (e.g., in the absence of the solar microinverter and a corresponding soft-start process). This represents a benefit of the system in which less mechanical stress is imposed on the motor from current/torque spikes otherwise resulting from a direct on-line start. Similarly, the lower peak currents provide the peak-load shaving benefit, thereby reducing demand load stress on the power grid and resulting in lower costs/rates for power obtained from the power grid. The reduced peak currents can include those experienced during operation in the second relay state and/or upon transition from the first to second relay state. In various embodiments, a starting peak current after switching from the soft-start can be less than 20, 10, 5, 2, or 1 A and/or less than 1, 0.5, 0.2, 0.1, or 0.05 p.u. (per unit). In contrast, a starting peak current resulting from a direct on-line start can be about 80-100 A or about 6-7 p.u. Alternatively or additionally, the reduced starting peak current after switching from the soft-start can be expressed as a fractional value relative to a corresponding starting peak current resulting from a direct on-line, for example a soft-start starting peak current of at least 0.01, 0.1, 1, 2, or 5% and/or up to 1, 2, 4, 6, 8, 10, 12, 15, 20, or 25% relative to a direct on-line starting peak current. In general, lower starting peak currents can be obtained with a lower constant torque applied during the soft-start process, although this increases the total start-up time to achieve the operating speed of the induction motor.

In a refinement, the method further comprises, after operating the solar power system with the relay system in the second state: operating the solar power system with the relay system in the third state, thereby providing power from the solar microinverter to a power grid through the power grid access point. Operating in the third state could be performed continuously in the off-season (i.e., non-growing season in an agricultural setting) when the induction motor and its associated machinery are not in use. Additionally, intermittently toggling between the second and third relay states can be performed during a growing season in an agricultural setting when the induction motor and its associated machinery are not in use (e.g., where an irrigation pump might only be needed for a portion of the daylight hours to provide sufficient irrigation).

While the disclosed articles, apparatus, and methods are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

Figure 1:
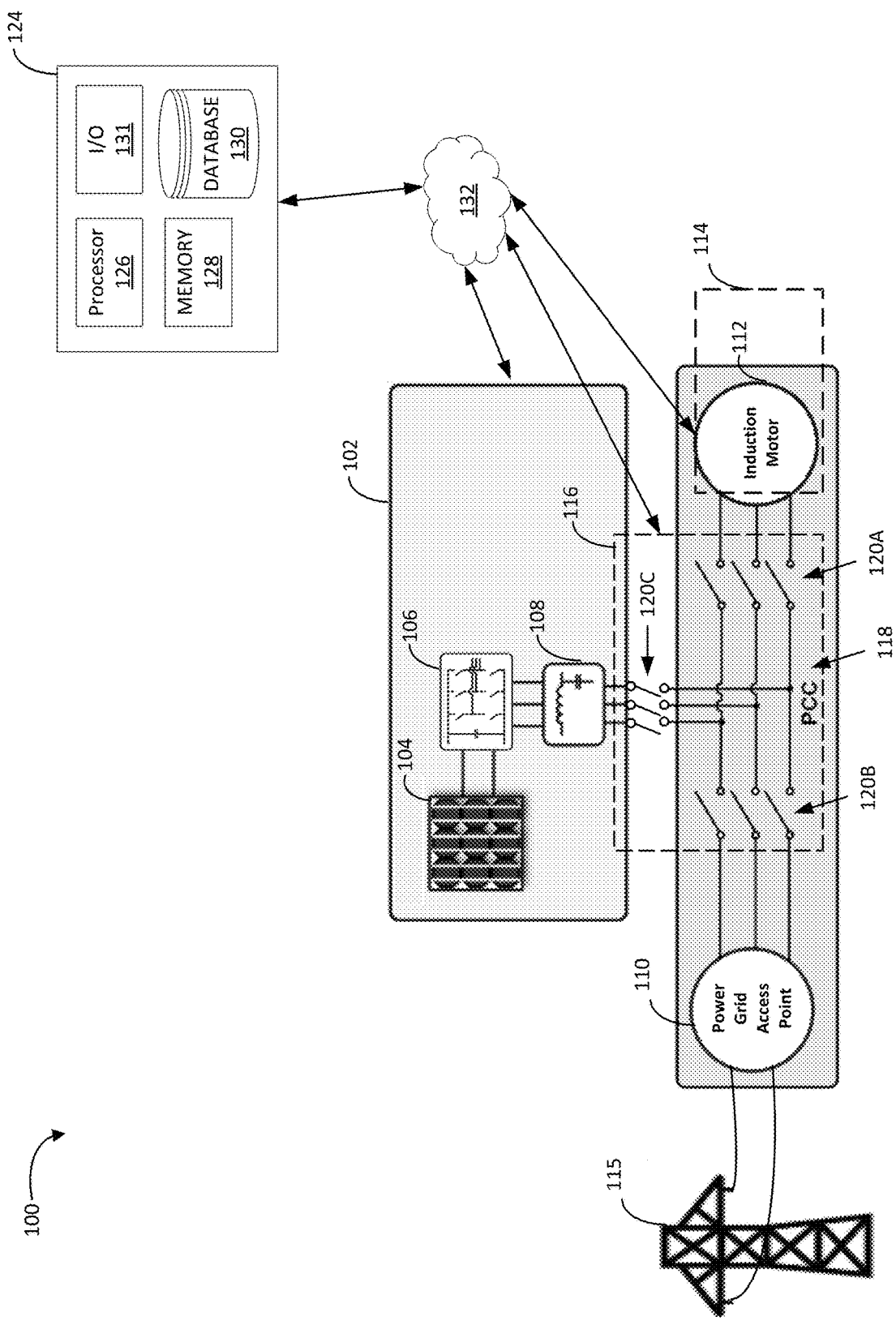
FIG. 1 depicts a block diagram of an exemplary solar power system for induction motor soft-starting and power compensation.

The figures described above depict various embodiments of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Referring the drawings, FIG. 1 depicts a block diagram of an exemplary solar power system (SPS) 100 for induction motor soft-starting, power compensation, and/or renewable energy generation, in which the techniques described herein may be implemented, according to some embodiments.

The SPS 100 may include one or more solar microinverters 102. The solar microinverter 102 may include one or more PV cells 104 and/or solar panels. Each PV cell 104 may be comprised of semiconductor material(s), such as silicon. The PV cell 104 may include one or more p-type layers doped to create an excess of positively charged particles and/or n-type layers doped to create an excess of negatively charged particles. The layers may be configured to convert photonic sunlight into a flow of electrical current, for example when receiving sunlight/solar radiation and providing corresponding DC power output. A solar panel may include a single PV cell 104 or multiple PV cells 104, such as when electrically coupling multiple PV cells 104 together. The solar panels and/or PV cells 104 may be electrically coupled in one or more ways, e.g., in series which may increase the total voltage output of the coupled PV cells 104 and/or solar panels, in parallel which may increase the total current output of the coupled PV cells 104 and/or solar panels, and/or any combination thereof. In one refinement, one or more PV cells 104 may be adapted and/or configured to provide a DC output power of approximately 3 kW.

The solar microinverter 102 may include one or more microinverters 106, such as a three-phase inverter. The microinverters may converter DC (e.g., from PV cells 104) to AC. In one refinement, the one or more microinverters may be adapted to provide an AC output power of about 5 kVA.

The solar microinverter 102 and/or the microinverter 106 may include, and/or be electrically coupled to, one or more line filters 108, such as one or more LC or LCL filters, e.g., to smooth current output, reduce harmonics, and/or other suitable purposes as is known in the art.

The one or more microinverters 106 and line filters 108 may be electrically connected to the one or more PV cells 104. In one aspect, the microinverter 106 may be a three-phase microinverter, and the microinverter 106 and line filters 108 may be configured to receive the DC power generated by the one or more PV cells 104 and output corresponding AC power, such as three-phase AC power. In some embodiments, the AC power output by the solar microinverter 102 may include photovoltaic reactive power ($Q_{PV}$) and/or photovoltaic active power ($P_{PV}$).

In some embodiments, the microinverter 106 may comprise and/or include additional components, such as one or more DC-DC converters (e.g., to stabilize DC voltages from the PV cells 104), inverters (e.g., to provide AC from DC), control circuitry (e.g., to adjust and/or monitor electrical characteristics, such as the power output, voltage, current, frequency), communication interfaces (e.g., wireless or powerline communication to transmit real-time monitoring and performance data), as well as any other suitable components. In some embodiments, the microinverter 106 may be installed and/or otherwise integrated with PV cells 104 and/or a solar panel, allowing for independent power conversion and optimization at the solar panel level. In some aspects, the solar microinverter 102 may be shunt-connected to one or more other components of the SPS 100, such as a PCC 118.

The SPS 100 may include a power grid access point 110, or, alternatively, an access point 110 to an external power grid. The power grid access point 110 may represent, include, and/or be electrically coupled to any source of grid and/or line power, such as a power grid 115. For example, the power grid access point 110 may be electrically coupled to a power grid 115 operating at 230 V/50 Hz, 120 V/60 Hz, or any other suitable power, voltage, frequency, current, etc. In one embodiment, the power grid access point 110 may provide an AC power comprising grid reactive power ($Q_G$) and grid active power ($P_G$). As used herein, the terms power grid access point 110, grid, and/or power grid 115 may be used interchangeably. Put another way, electrical connection between the power grid access point 110 and a component of the SPS 100 can similarly include electrical connection between the power grid 115 and the component of the SPS 100. Analogously, electrical isolation between the power grid access point 110 and a component of the SPS 100 can similarly include electrical isolation between the power grid 115 and the component of the SPS 100.

In some embodiments, the power grid access point 110 and/or power grid 115 may include additional components, such as control circuitry (e.g., to adjust and/or monitor electrical characteristics), communication interfaces (e.g., wireless or powerline communication to transmit real-time monitoring and performance data), as well as any other suitable components.

The SPS 100 may include the induction motor 112. The induction motor 112 may be and/or include a line-starting or self-starting AC electric motor with an induction-driven rotor/stator structure. The induction motor 112 may drive, be electrically coupled to, and/or incorporated within one or more machines 114, such as a mechanical machine, an asynchronous machine, a line-started electric machine, and/or any other suitable machine, including machines which may operate on the power generated by the induction motor 112. In some embodiments, the machine 114 may include one or more pumps (e.g., an irrigation pump), HVAC (heating, ventilation, air conditioning) systems and/or components thereof, dryers (e.g., grain dryer), fans, and/or any combination thereof, e.g., the induction motor 112 driving multiple machines 114. In a refinement, the induction motor 112 may be coupled to a pump, for example a pump incorporating the induction motor as a component thereof. In a refinement, the pump may be coupled to an agricultural irrigation system, for example including one or more of a reservoir or other water source, tubes/pipes for water transport and delivery, spray nozzles for application of water to an agricultural field, etc.

In some embodiments, the induction motor 112 may include additional components, such as control circuitry (e.g., to monitor electrical characteristics), communication interfaces (e.g., wireless or powerline communication to transmit real-time monitoring and performance data), as well as any other suitable components.

The SPS 100 may include a relay system 116. The relay system 116 may include one or more relays, contactors and/or switches (switch) 120 (e.g., switches 120A, 120B, 120C). The switch 120 may include one or more relays or switches, e.g., in the case of a three-phase component having three wires and/or points of connection, the switch 120 for the three-phase component may include 3 switches, one for each wire and/or connection. The switch 120 may be electrically connected (e.g., directly or indirectly) between two or more components of the SPS 100. When the switch 120 is closed or engaged, the two or more components may be electrically connected/coupled via the switch 120, and when the switch 120 is open or disengaged, the two or more devices may be in electrical isolation from one another. In one example, the switch 120 may include Schneider Electric™ Model DPE25G7. In some aspects, the switch 120 may be integral to a component of the SPS 100, for example the induction motor 112 may include the switch 120 (e.g., switch 120A).

In some aspects, the relay system 116 may include a point of common coupling (PCC) 118 to which one or more of the solar microinverter 102, the power grid access point 110, induction motor 112, and/or any other suitable component of the SPS 100 may be electrically coupled directly, or indirectly (e.g., via a switch 120). In some embodiments, the switches may include mechanical relays wherein the operational characteristics of the relays (e.g., responsiveness, delay, deadtime, power loss, etc.) may influence the performance of the SPS 100, 200, 250, 300 when switching between power sources, states, modes of operation, and the like, as described herein.

In one refinement, the relay system 116 may include a first switch 120A. The first switch 120A may electrically couple the PCC 118 and the induction motor 112 such that (i) the PCC 118 and the induction motor 112 may be in electrical connection when the first switch 120A is closed and (ii) the PCC 118 and the induction motor 112 may be electrically isolated when the first switch 120A is open.

The relay system 116 may include a second switch 120B. The second switch 120B may electrically couple the PCC 118 and the power grid 115 via the power grid access point 110 such that (i) the PCC 118 and the power grid 115 and/or the power grid access point 110 may be in electrical connection when the second switch 120B is closed, and (ii) the PCC 118 and the power grid 115 and/or the power grid access point 110 may be electrically isolated when the second switch 120B is open.

The relay system 116 may include a third switch 120C. The third switch 120C may electrically couple to the PCC 118 and the solar microinverter 102 such that (i) the PCC 118 and the solar microinverter 102 are in electrical connection when the third switch 120C is closed, and (ii) the PCC 118 and the solar microinverter 102 are electrically isolated when the third switch 120C is open. In some refinements, the solar microinverter 102 and the PCC 118 may be shunt-connected.

The SPS 100 may include one or more computer systems 124. The computer system may include a desktop computer, laptop computer, server, mobile device, or any other suitable computing device and/or computing system. The computer system 124 may be installed/integrated with, wired to, and/or may otherwise be in communication with one or more hardware and/or software components of the SPS 100, such as the induction motor 112, the solar microinverter 102, the relay system 116, and/or any other suitable component. The computer system 124 may be locally associated with one or more SPS 100 components, such as part of a local network (LAN) and/or wide-area network (WAN) of a SPS 100 component. The computer system 124 may be a remotely associated with one or more SPS 100 components, such as a part of a cloud network.

The computer system 124 may include one or more processors 126. The processors 126 may include one or more suitable processors (e.g., central processing units (CPUs) and/or graphics processing units (GPUs)). The processors 126 may be connected to a memory 128 via a computer bus (not depicted) responsible for transmitting electronic data, data packets, or otherwise electronic signals to and from the processors 126 and memory 128 in order to implement or perform the machine-readable instructions, methods, processes, elements, or the like. The processors 126 may interface with the memory 128 via the computer bus to execute an operating system (OS) and/or computing instructions contained therein, and/or to access other services/aspects. For example, the processor 126 may interface with the memory 128 via the computer bus to create, read, update, delete, or otherwise access or interact with the data stored in the memory 128 and/or a database 130.

The memory 128 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 128 may store an operating system (OS) (e.g., Microsoft Windows, Linux, UNIX, etc.) capable of facilitating the functionalities, apps, methods, or other software as discussed herein.

The memory 128 may store computer-executable instructions, e.g., a computer program, which may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 126 (e.g., working in connection with the respective operating system in memory 128) to facilitate, implement, or perform the machine readable instructions, methods, processes, etc. The program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). For example, the computer system 124 may store one or more programs to control operation of the SPS 100 components, such to control powering the induction motor 112 on/off, powering the solar microinverter 102 on/off and/or controlling modes of operation, controlling voltage and/or frequency delivered by the solar microinverter 102 (e.g., for a soft-start using V/Hz control), switching the relay system 116 between its various states, monitoring SPS 100 status, etc.

The database 130 may be a relational database, such as Oracle, DB2, MySQL, a NoSQL based database, such as MongoDB, or another suitable database. The database 130 may store data, for example data associated monitoring operational characteristics of the SPS 100, such current in various system components, active and reactive power supplied or received by various system components, motor speed, water pressure in a pump or corresponding water line coupled to the induction motor, etc.

In one aspect, the computing system 124 may include an input/output (I/O) module 131, which may include a set of computer-executable instructions implementing communication functions. The I/O module 131 may include a communication component configured to communicate (e.g., send and receive) data via one or more external/network port(s) to one or more networks or local terminals. The I/O module 131 may further include or implement an operator interface configured to present information to an administrator or operator and/or receive inputs from the administrator and/or operator. An operator interface may provide a display screen. The I/O module 131 may facilitate I/O components (e.g., ports, capacitive or resistive touch sensitive input panels, keys, buttons, lights, LEDs), which may be directly accessible via, or attached to, the computer system 124.

The SPS 100 may include a network 132 may comprise any suitable network or networks, including a local area network (LAN), wide area network (WAN), Internet, or combination thereof. For example, the network 132 may include a wireless cellular service (e.g., 4G, 5G, etc.). Generally, the network 132 enables bidirectional communication between the computer system 124 and one or more components of the SPS 100. In one aspect, the network 132 may comprise a cellular base station, such as cell tower(s), communicating to the one or more components of the SPS 100 via wired/wireless communications based upon any one or more of various mobile phone standards, including NMT, GSM, CDMA, UMTS, LTE, 5G, or the like. Additionally or alternatively, the network 132 may comprise one or more routers, wireless switches, or other such wireless connection points communicating to the components of the SPS 100 via wireless communications based upon any one or more of various wireless standards, including by non-limiting example, IEEE 802.11a/b/c/g (Wi-Fi), Bluetooth, and/or the like.

The SPS 100 may include additional, fewer, and/or alternate components, and may be configured to perform additional, fewer, or alternate actions, including components/actions described herein.

Example Configurations

Figure 2A:
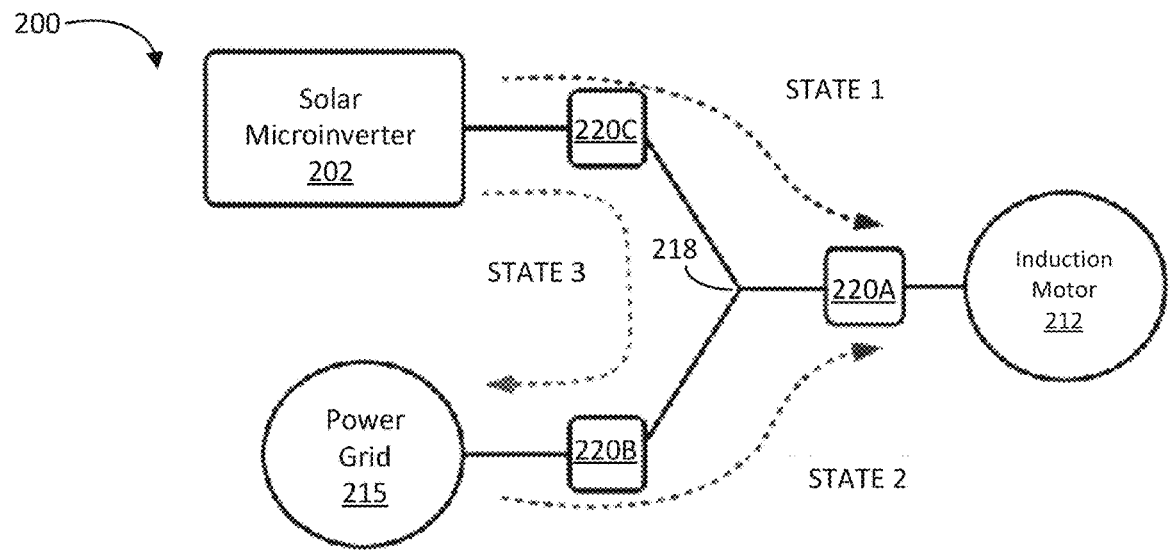
FIG. 2A depicts a block diagram of a solar power system electrically coupled in a Y (wye)-configuration and indicating various relay states, according to an embodiment.
Figure 2B:
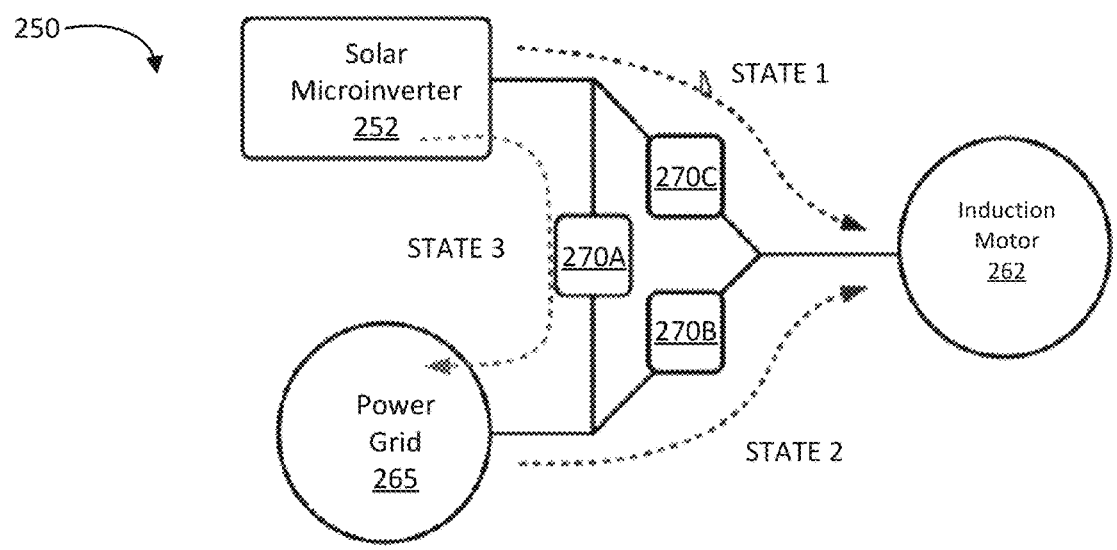
FIG. 2B depicts a block diagram of a solar power system electrically coupled in a Δ (delta)-configuration and indicating various relay states, according to an embodiment.

A relay system such as relay system 116 may be adapted and/or configured to operate in one or more states, as illustrated in the block diagrams of FIGS. 2A and 2B, according to some embodiments. The state of operation of the relay system may be associated with one or more modes of operation of the solar microinverter and/or functions of the SPS (e.g., soft-starting, continuous operation, peak-shaving, reactive power compensation, renewable energy regeneration, etc.), among other things.

The relay system may operate in, and/or switch between, the one or more states automatically (e.g., when sensing operational parameters of the SPS, receiving a signal, voltage, current or the like associated with a switching state, according to a schedule, etc.), manually (e.g., via user of a computer system controlling the relay system, manually switch the states of the relays via an interface, etc.), and/or any combination thereof. For example, a computer system (e.g., computer system 124, a processor and/or controller associated with the relay system, etc.) may sense an irrigation pump connected to the induction motor is inactive, and in response send one or more commands, instructions, and/or otherwise cause the relay system to close (engage) or open (disengage) one or more switches (e.g., switches 120A, 120B, 120C of FIG. 1) causing the relay system to transition (e.g., by electrically, electronically, or mechanically switching between) from providing power to the induction motor to providing renewable energy to the power grid.

FIG. 2A depicts an example SPS 200, such as the SPS 100 of FIG. 1, according to an embodiment. FIG. 2A further depicts state information associated with the relay system of SPS 200. The relay system may include one or more switches 220A, 220B, 220C, such as the switches 120, 120A, 120B, and/or 120C of FIG. 1. The SPS 200 may include a solar microinverter 202, an induction motor 212, and a power grid 215 or a power grid access point (not separately illustrated), such as the solar microinverter 102, the induction motor 112, the power grid 115, and the power grid access point 110 of FIG. 1, respectively. The solar microinverter 202, an induction motor 212 and a power grid 215 may each be electrically coupled to the PCC 218 (such as PCC 118 of FIG. 1) via the switches 220A, 220B, 220C in a Y (wye)-configuration. According to the wye-configuration, the induction motor 212 is electrically coupled to PCC 218 via one or more switches 220A; (ii) the power grid 215 is electrically coupled to PCC 218 via one or more switches 220B; and (iii) the solar microinverter 202 is electrically coupled to PCC 218 via one or more switches 220C.

FIG. 2B depicts an example SPS 250 having an alternate configuration from the SPS 200, according to an embodiment. FIG. 2B further depicts state information associated with the relay system of SPS 250. The relay system may include one or more switches 270A, 270B, 270C, such as switches as described herein with respect to switches 120, 120A, 120B, and/or 120C of FIG. 1. The SPS 250 may include a solar microinverter 252, an induction motor 262, and a power grid 265 or a power grid access point (not separately illustrated) such as the solar microinverter 102, the induction motor 112, the power grid 115, and the power grid access point 110 of FIG. 1, respectively. The solar microinverter 252, the induction motor 262, and the power grid 265 may be electrically coupled to one another via the switches 270A, 270B, 270C in a Δ (delta)-configuration. According to the delta-configuration, the solar microinverter 252 is electrically coupled to the power grid 265 via one or more switches 270A; (ii) the power grid 265 is electrically coupled to the induction motor 262 via one or more switches 270B; and (iii) the solar microinverter 252 is electrically coupled to induction motor 262 via one or more switches 270C.

In the wye-configuration of SPS 200, there may be at least two switches which may need to be closed in order to electrically couple the induction motor 212 to either of the solar microinverter 202 (e.g., switches 220A and 220C) or to the power grid 215 (e.g., switches 220A and 220B). There may also be two sets of switches (e.g., switches 220B and 220C) which may need to be closed in order to electrically couple the solar microinverter 202 to the power grid 215.

In the delta-configuration, there may be at least (or only) a single switch which may need to be closed in order to electrically couple the induction motor 262 to either of the solar microinverter 252 (e.g., switch 270C) or the power grid 265 (e.g., switch 270B). There may also be a single switch which may need to be closed in order to electrically couple the solar microinverter 252 to the power grid 265 (e.g., switch 270A). As a result, the delta-configuration may provide certain optimized operational and/or performance characteristics of the relay system and/or SPS 250 when switching between power sources 252, 265, as only one set of switches may need to be closed/engaged as opposed to two in the wye-configuration of SPS 200.

Example Relay States and Modes of Operation

The SPS relay system, such as relay system 116, may be instructed and/or otherwise configured to operate in one or more states, such as by a computer system such as computer system 124. Each state may be associated with one or more functions of the SPS, such as being idle, soft starting of the induction motor, continuous operation, peak shaving and reactive power consumption, and/or renewable energy generation. A (shunt-connected) solar microinverter may be configured to operate in one or more modes, and the one or more modes may correspond with the one or more states of the relay system and one or more functions of the SPS.

Figure 3A:
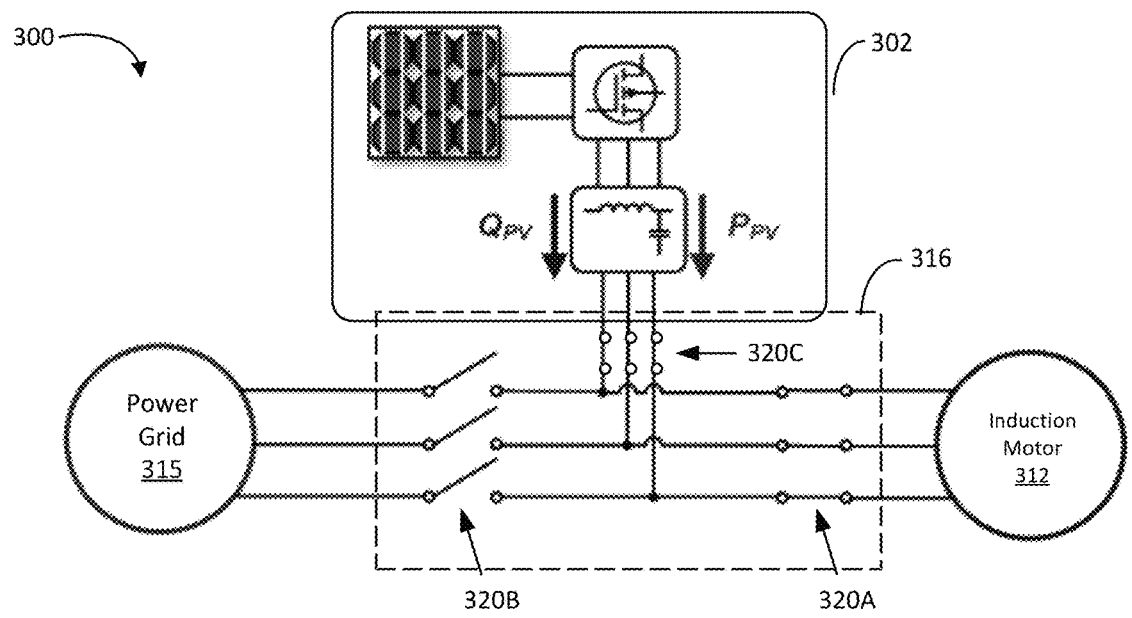
FIG. 3A depicts a block diagram of a solar power system idle function having a relay system in a first state and/or a solar microinverter operating in a mode 2, according to an embodiment.

FIGS. 3A, 3B, 3C and 3D each depict a block diagram of an SPS 300 having a relay system 316 configured in a first state, second state, third state and fourth state, respectively. According to the first state of the relay system 316 of FIG. 3A: (i) the induction motor 312 and the solar microinverter 302 may be in electrical connection (or electrical communication); (ii) the induction motor 312 and the power grid 315 (or access point) may be in electrical isolation; and (iii) the solar microinverter 302 and the power grid 315 (or access point) may be in electrical isolation. The first state may include switches 320A, 320C being closed and switch 320B being open in the wye-configuration as illustrated in FIG. 3A, or switch 270C being closed and switches 270A, 270B being open in the delta-configuration of FIG. 2B. The first state may provide the SPS 300 to soft-start of the induction motor 312. For example, in the first state a computer system may instruct the solar microinverter 302 to provide one or more of reactive power ($Q_{PV}$), active power ($P_{PV}$), and/or a starting current (torque and speed regulation) to the induction motor 312. This may allow for a smooth transition between the induction motor 312 being initially driven by the solar microinverter 302 to being driven by the power grid 315 in the second state, as further described herein. The soft-starting may improve the reliability of the induction motor 312 (as well as any machine connected thereto, such as an irrigation pump) and the power grid 315.

The first state may be associated with a second mode (mode 2) of operation of the solar microinverter 302 in which the solar microinverter 302 drives the induction motor 312, e.g., from the idle state of mode 1. In some embodiments of mode 2, the power provided to induction motor 312 by the solar microinverter 302 may be controlled (e.g., via computer system 124) using a V/Hz control method to mitigate and/or eliminate a high peak starting current of the induction motor 312, e.g., as compared to a starting current of the induction motor 312 from direct on-line starting of the induction motor 312 from the power grid 315.

The V/Hz control process may include: (i) ramping a voltage of the power provided by the solar microinverter 302 from zero to a selected setpoint voltage (e.g., matching voltage of AC power to be provided by power grid 315, such as 240 Vrms); (ii) ramping a frequency of the power provided by the solar microinverter 302 from zero to a selected setpoint frequency (e.g., matching frequency of AC power to be provided by power grid 315, such as 60 Hz); and/or (iii) synchronizing the power provided by the solar microinverter 302 with power provided by the power grid 315 (e.g., phase- or angle-matching the AC power output by the solar microinverter 302 to the AC power provided by power grid 315 when switching from the soft-start process to a continuous operation stage). In one aspect, a computer system such as computer system 124 may monitor various operational characteristics, among other things, of the solar microinverter 302, the power grid 315 and/or the induction motor 312 and may control at least some of the V/Hz process based thereupon. For example, once an irrigation pump for an irrigation system is electrically coupled to the induction motor 312, a user of the SPS 300 may, via a computer system such as computer system 124, engage the induction motor to operate in a soft-starting mode and relay system in the first state.

Figure 3B:
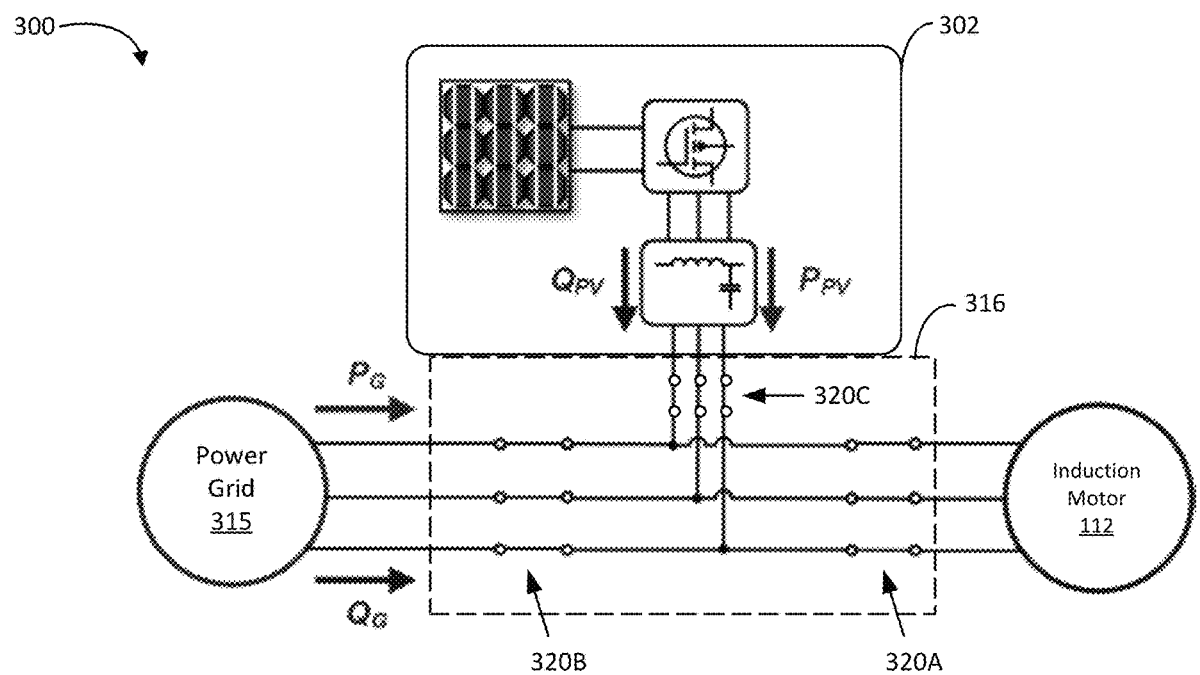
FIG. 3B depicts a block diagram of a solar power system induction motor soft-starting function having a relay system in a second state and/or a solar microinverter operating in mode 3, according to an embodiment.

In the second state of the relay system 316, the induction motor 312, the solar microinverter 302, and the power grid 315 (or access point) may be in electrical connection (or electrical communication) with each other. The second state may include switches 320A, 320B, 320C being closed in the wye-configuration as illustrated in FIG. 3B, or switches 270A, 270B, 270C being closed in the delta-configuration of FIG. 2B. In the second state, the SPS 300 may provide continuous operation of the induction motor 312, e.g., in which the induction motor 312 may be primarily powered by the power grid 315, e.g., the grid may provide active and reactive power. The second state may provide a mode of operation of the SPS 300 which includes peak shaving and/or (reactive) power compensation from the solar microinverter 302. In some aspects, the induction motor 312 may consume a significant amount of reactive power for operation. In the second state, the solar microinverter 302 may provide both active and reactive power, e.g., to save the electricity cost and burden on the power grid 315, which may lead to cost-saving through peak-shaving during the daytime when the electricity cost may be higher than other times of the day.

A transition from mode 2 to a third mode (mode 3) may occur when the induction motor 312 reaches a steady-state condition, e.g., which may be detected by monitoring the performance of the induction motor 312 by the computer system 124. When a steady-state condition (e.g., substantially steady stator current, rotor current, inertia of the induction motor 312, speed of the induction motor 312 and/or current of the solar microinverter 302) is reached by the induction motor 312, the solar microinverter 302 may be temporarily disengaged. When disengaged, the solar microinverter 302 may provide substantially zero (0)/no active power ($P_{PV}$) and/or substantially zero (0)/no reactive power ($Q_{PV}$) to the PCC (such as PCC 118) and/or induction motor 312. While the solar microinverter 302 is temporarily disengaged, the induction motor 312 may continue to run using pre-built inertia. At a time substantially proximate, and/or or equal, to the solar microinverter 302 being disengaged, the switch 320B may be closed (e.g., by the computer system or other controller of the relay system 316) allowing the power grid 315 to provide AC power (e.g., grid reactive power ($Q_G$) and/or grid active power ($P_G$)) to the induction motor 312, e.g., when transitioning from mode 2 to mode 3. The transition from mode 2 to mode 3 may ensure an interruption-free operation of a machine (e.g., machine 114) connected to the induction motor 312, such as an irrigation pump.

In one or more states (e.g., the first and/or second states), the solar microinverter 302 may provide reactive power ($Q_{PV}$) matching of the induction motor 312 as long as there is at least some sunlight/solar radiation. The amount active power ($P_{PV}$) the solar microinverter 302 provides may be proportional to intensity of sunlight/solar radiation. Thus, even when sunlight/solar radiation is low, the solar microinverter 302 may still provide benefits of soft-starting, peak load shaving, and reactive power compensation for an otherwise grid-powered induction motor 312.

Figure 3C:
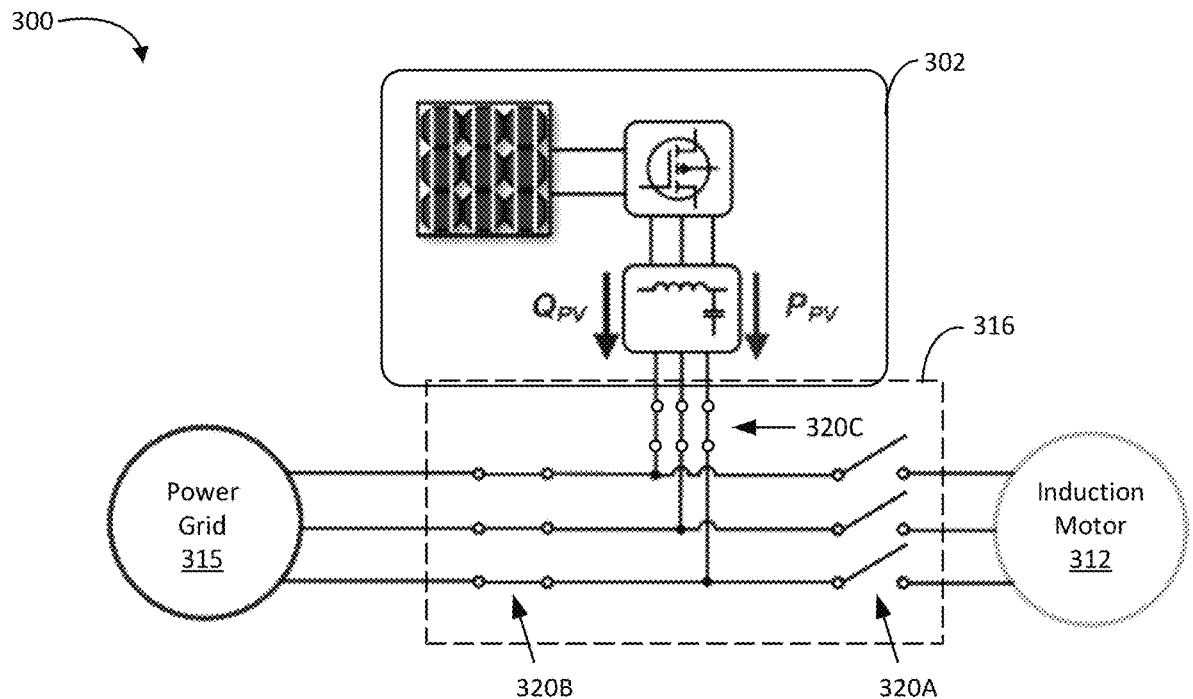
FIG. 3C depicts a block diagram of a solar power system peak shaving and reactive power compensation function having a relay system in a third state and/or a solar microinverter operating in mode 4, according to an embodiment.

In the third state of the relay system 316: (i) the induction motor 312 and the solar microinverter 302 may be in electrical isolation; (ii) the induction motor 312 and the power grid 315 (or access point) may be in electrical isolation; and (iii) the solar microinverter 302 and the power grid 315 (or access point) may be in electrical connection (or electrical communication). The third state may include switches 320B, 320C being closed and switch 320A being open in the wye-configuration as illustrated in FIG. 3C, or switch 270A being closed and switches 270B, 270C being open in the delta-configuration of FIG. 2B. The third state may provide a mode of operation of the SPS 300 which provides renewable energy generation, for example during a period of downtime or non-operation of the induction motor 312, in which the solar microinverter 302 provides power to the power grid 315.

At a time after the transition from mode 2 to mode 3 is completed (e.g., when a machine 114 such as an irrigation pump may no longer be in use), the solar microinverter 312 may enter a fourth mode (mode 4). During mode 4 the solar microinverter 312 may be already-engaged or re-engaged to provide one or more of active power ($P_{PV}$) and/or reactive power ($Q_{PV}$) to the PCC 118 and/or the power grid 315, e.g., for renewable energy generation.

Figure 3D:
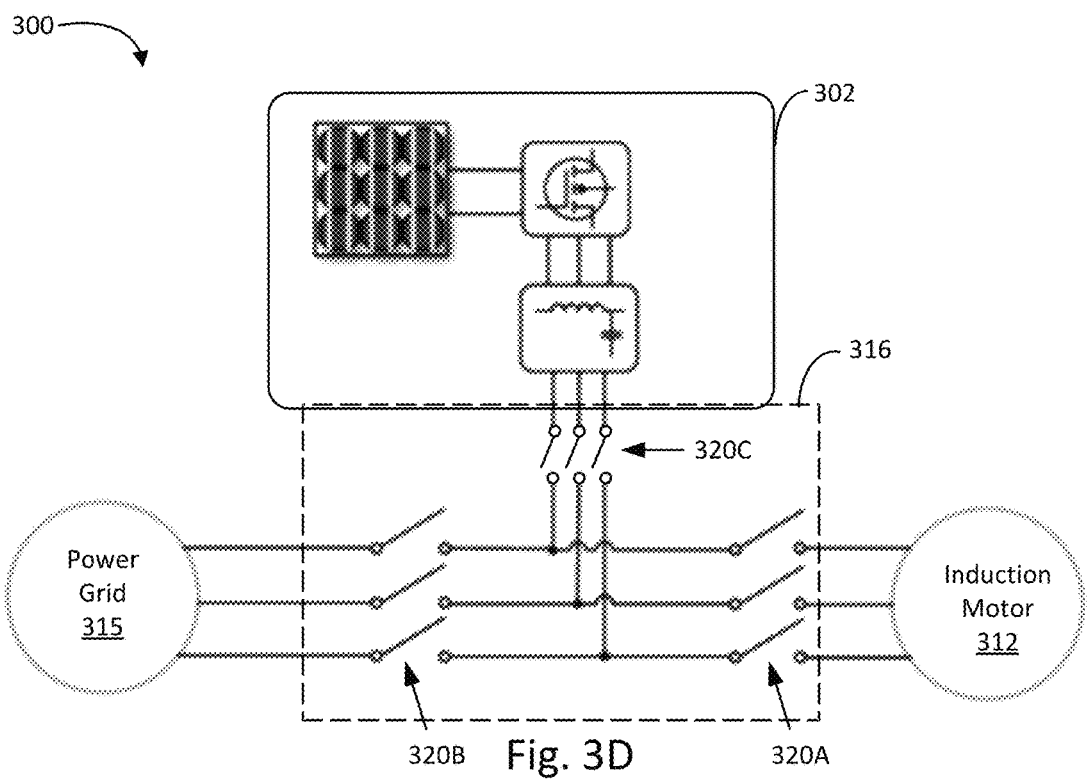
FIG. 3D depicts a block diagram of a solar power system renewable energy generation function having a relay system in a fourth state and/or a solar microinverter operating in mode 1, according to an embodiment.

In the fourth state of the relay system 316, the induction motor 312, the solar microinverter 302, and the power grid 315 (or access point) may be in electrical isolation with each other. The fourth state may include at least two of switches 320A, 320B, 320C being open in the wye-configuration as illustrated in FIG. 3D, or switches 270A, 270B, 270C being open in the delta-configuration. The fourth state may provide a first mode of operation of the SPS 300 in which the induction motor 312 may be in an idle or "off" state. The fourth state may be associated with a first mode (mode 1) of the solar microinverter 302 in which no power flows, resulting in the idle, stationary state of the SPS 300.

In some embodiments, the solar microinverter 302 may include a switch or other mechanism (e.g., as part of the solar panel, inverter, etc.) prevent the flow of power from the solar microinverter 302 to the rest of the SPS 300, in which case switch 320C may be optional, duplicative, and/or otherwise unnecessary to the SPS 300.

Method of Operating an SPS

Figure 4:
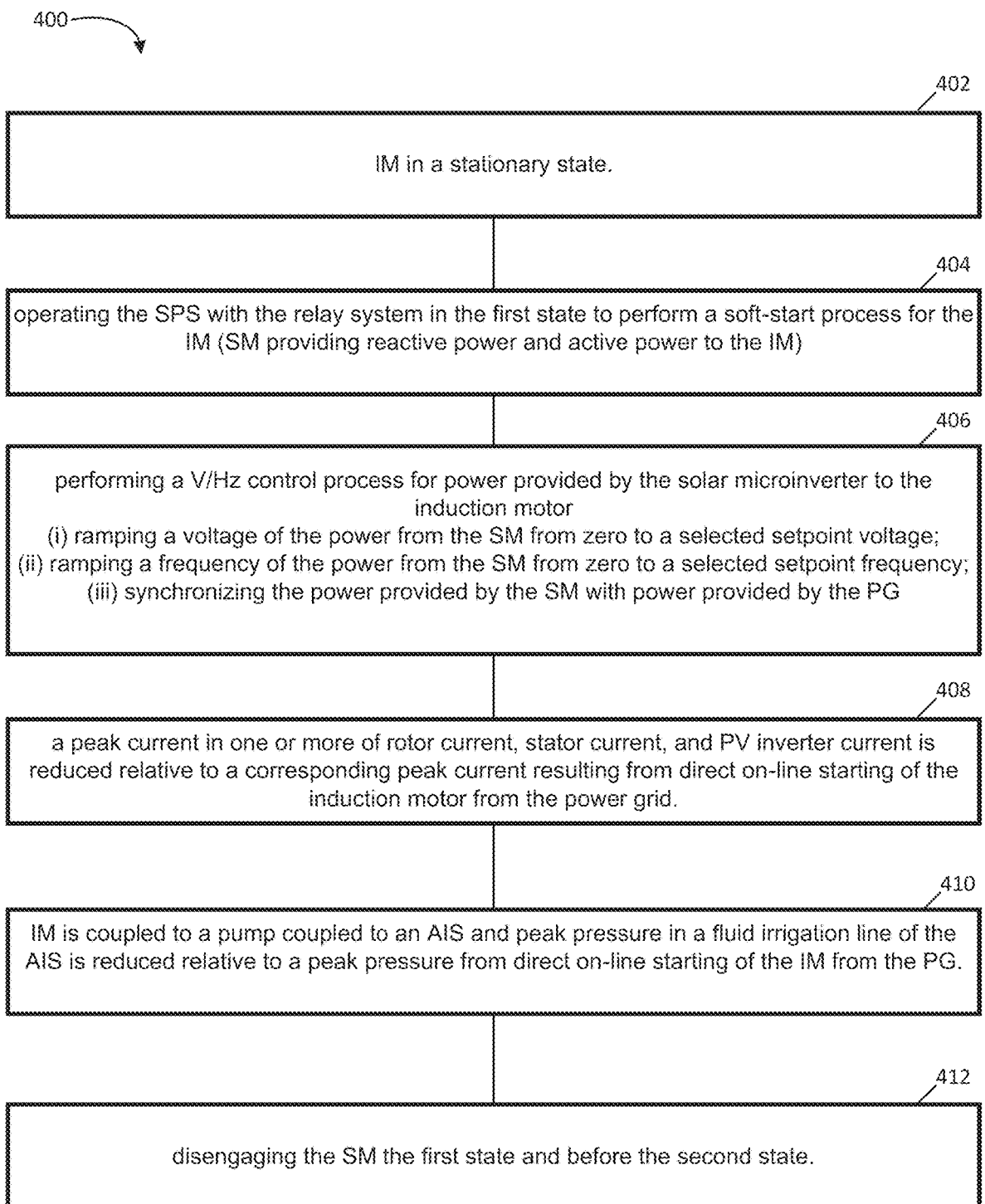
FIG. 4 depicts a flow diagram of an exemplary method of operating a solar power system.
Figure 4:
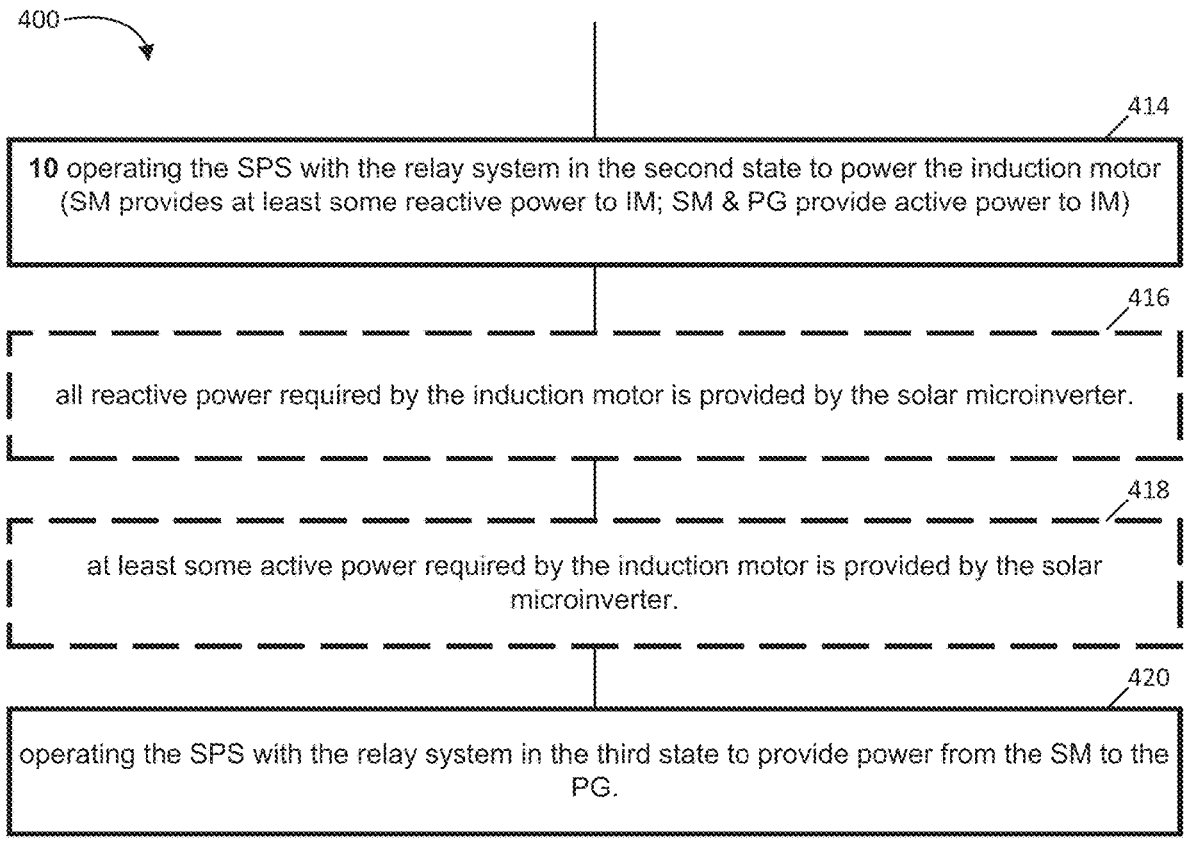

In another embodiment depicted by FIG. 4, the disclosure relates to a method 400 of operating an SPS, such as SPS 100, 200, 250, 300. The method 400 may include operating the SPS according to any of the variously disclosed embodiments, refinements, etc.

In one aspect, the method 400 may include the induction motor (e.g., IM or induction motor 102) in a stationary state (block 402), e.g., an idle or powered-off state, such with the relay system in the fourth state of FIG. 3D and/or mode 1.

In one aspect, the method 400 may include transitioning the SPS from a stationary state (block 402) to operating the SPS in the first state (e.g., the first state of FIG. 3A and/or mode 2) to perform a soft-start process for the induction motor (block 404). The soft-start process (block 404) may include operating the SPS with the relay system (e.g., relay system 116) in the first state with the solar microinverter providing reactive power $Q_{PV}$ and active power $P_{PV}$ to the induction motor to engage (or start) the induction motor. For example, the soft-start (block 404) may achieve a steady state with respect to one or more of induction motor inertia, induction motor stator current, induction motor rotor current, and solar microinverter current, e.g., the steady state may be detected by one or more computer systems such as computer system 124. The end or target state of the soft-start process (block 404) may be characterized by a (quasi) steady state of the induction motor so that it is ready to switch from the soft start mode (block 404) to power grid mode with reactive compensation with minimal/reduced current spikes (e.g., reflecting a peak shaving benefit). For example, in a typical direct on-line start, motor torque may be initially high and not constant. In contrast, using the disclosed SPS and soft-start process (block 404), inductive motor torque may be generally constant and/or the inductive motor speed may steadily increase during the soft-start. As an example, given an induction motor with a given rated speed (e.g., a constant or target rotational speed at steady or final operation), the soft-start process (block 404) may be performed until motor speed is within 1%, 2%, 3%, 5%, 7%, or 10% of the rated speed (e.g., at least 90%, 93%, 95%, 97%, 98%, or 99% and/or up to 100% of the rated speed).

In a refinement of the soft-start process (block 404), the soft-start process (block 404) may include performing a V/Hz control process for power provided by the solar microinverter (SM) to the induction motor (block 406). The V/Hz control process (block 406) may include: (i) ramping a voltage of the power provided by the solar microinverter from zero to a selected setpoint voltage (e.g., matching voltage of AC power to be provided by power grid); (ii) ramping a frequency of the power provided by the solar microinverter from zero to a selected setpoint frequency (e.g., matching frequency of AC power to be provided by power grid); and/or (iii) synchronizing the power provided by the solar microinverter with power provided by the power grid (e.g., phase- or angle-matching the AC power output by the solar microinverter to the AC power of the power grid when switching from the soft-start process (block 404) to a continuous operation stage). In one aspect, a computer system such as computer system 124 may monitor various operational characteristics, among other things, of the solar microinverter, the power grid (PG) and/or the induction motor and may control at least some of the V/Hz process (block 406) based thereupon.

In a further refinement of the soft-start process (block 404), a peak current in one or more of the induction motor rotor current, the induction motor stator current, and/or the solar microinverter current (e.g., the current of microinverter 106) may be reduced relative to a corresponding peak current resulting from direct on-line starting of the induction motor from the power grid (block 408), e.g., relative to a peak current in the absence of the solar microinverter and/or a corresponding soft-start process (block 404). Block 408 may represent a benefit of the SPS in which less mechanical stress is imposed on the induction motor from current/torque spikes otherwise resulting from a direct on-line start. Similarly, the lower peak currents provide the peak-load shaving benefit, thereby reducing demand load stress on the power grid and resulting in lower costs/rates for power obtained from the power grid. The reduced peak currents can include those experienced during operation in the second relay state of (e.g., FIG. 3B) and/or upon transition from the first relay state of (e.g., FIG. 3A) to second relay state (e.g., FIG. 3B).

In some embodiments, a starting peak current after switching from the soft-start may be less than 20 amperes (A), 10 A, 5 A, 2 A, or 1 A and/or less than 1 per unit (p.u.), 0.5 p.u., 0.2 p.u., 0.1 p.u., or 0.05 p.u. In contrast, a starting peak current resulting from a direct on-line start may be about 80 A-100 A or about 6 p.u.-7 p.u. Alternatively or additionally, the reduced starting peak current after switching from the soft-start may be expressed as a fractional value relative to a corresponding starting peak current resulting from a direct on-line, e.g., a soft-start starting peak current of at least 0.01%, 0.1%, 1%, 2%, or 5% and/or up to 1%, 2%, 4%, 6%, 8%, 10%, 12%, 15%, 20%, or 25% relative to a direct on-line starting peak current. In general, lower starting peak currents may be obtained with a lower constant torque applied during the soft-start process, although this may increase the total start-up time to achieve the operating speed of the induction motor.

In another refinement of the soft-start process (block 404), the induction motor may be coupled to a pump which is also coupled to an agricultural irrigation system (block 410). The peak pressure in a fluid (e.g., liquid water) irrigation line of the agricultural irrigation system which is produced by the induction motor-driven pump may be reduced relative to a corresponding peak pressure resulting from direct on-line starting of the induction motor from the power grid (e.g., in the absence of the solar microinverter and a corresponding soft-start process of block 404). This represents a benefit of the system in which less mechanical stress and/or damage is imposed on the motor, pump, and/or irrigation delivery tubing/piping by avoiding pressure spikes otherwise resulting from a direct on-line start. For example, any initial pressure peak observed after switching from the soft-start process is suitably within 2%, 5%, 10%, 15%, 20%, or 25% of the steady or target irrigation line pressure during continuous pump operation (e.g., not more than 102%, 105, 110%, 115%, 120%, or 125% of the steady or target pressure).

In yet a further refinement, the soft-start process (block 404) may include disengaging (e.g., temporarily) the solar microinverter after operating the SPS with the relay system in the first state, and before operating the SPS with the relay system in the second state (block 412). Disengaging the solar microinverter may represent a brief transition between the soft-start process (e.g., relay system first state or mode 2) and the continuous operation state (e.g., relay system first state or mode 3) in which the solar microinverter is in an idle state (e.g., relay system fourth state or mode 1). Disengaging the solar microinverter during the transition may minimize power spikes, current spikes, pressure spikes (e.g., when the induction motor may be connected to a fluid pump), or other undesired (initial) transient behavior of the SPS when switching to direct on-line power for the continuous operation state. The disengaged transition state may be characterized by a controlled/selectable (e.g., via the computer system 124) deadtime parameter. In one example, the disengaged transition state may be less than one electrical cycle, which may be approximately 16.7 milliseconds (ms) at 60 Hz (e.g., at least 1 ms, 2 ms, or 5 ms and/or up to 4 ms, 6 ms, 8 ms, 10 ms, 12 ms, or 15 ms; at least 2%, 5%, 10%, or 20% and/or up to 35%, 50%, 70%, 80%, 90%, or 95% of the electrical cycle).

In one aspect, the method 400 may include operating the SPS with the relay system in the second state to power the induction motor, such that (i) at least some reactive power required by the induction motor may be provided by the solar microinverter, and (ii) active power required by the induction motor may be provided by the solar microinverter and the power grid combined (block 414). In a refinement of the second state (block 414), all reactive power required by the induction motor may be provided by the solar microinverter (block 416). In a further refinement of the second state (block 414), at least some active power required by the induction motor may be provided by the solar microinverter (block 418), e.g., where the remaining active power demand of the induction motor is provided by the power grid.

In one aspect, the method 400 may include operating the SPS with the relay system in the third state to provide power from the solar microinverter to the power grid (block 420). In one refinement, the method 400 may include intermittently toggling between the second (block 414) state and third state (block 420). This may be beneficial if the induction motor and its associated machinery are not in use. For example, in agricultural setting where the SPS may operate in the second state (block 414) to power an irrigation pump which may only be needed for a portion of the daylight hours to provide sufficient irrigation, the SPS may transition to the third state (block 420) once the irrigation pump is no longer in use. In one refinement, the third state (block 420) may include a continuous off-season use (e.g., a non-growing season in an agricultural setting when the induction motor and its associated machinery are not in use) of the SPS to provide renewable energy to the power grid.

Various additional and/or alternative refinements of the disclosed methods are possible. It should be understood that not all blocks of the exemplary flow diagram 400 are required to be performed. Moreover, the exemplary flow diagram 400 is not mutually exclusive (e.g., block(s) from exemplary flow diagram 400 may be performed in any particular implementation).

Scalar Control Technique

In one embodiment, the solar microinverter (such as solar microinverter 102, 202, 252, 302) may be retrofitted to connect (e.g., shunt-connected) to an existing line-connected induction motor (e.g., induction motor 112, 212, 262, 312). An existing line-connected induction motor may not have rotor position estimation capabilities (e.g., sensors such as encoders or resolvers). Accordingly, the solar microinverter may utilize a scalar control technique, i.e., V/Hz control, to maintain a constant starting current during acceleration of a machine, such as an irrigation pump, during soft-starting of the induction motor, etc. Synchronization with the power grid (e.g., via the power grid access point) may be important, if not critical, when transitioning from mode 2 to mode 3.

When the induction motor is operating in its rated condition, the solar microinverter output voltage may be at its peak and have the identical frequency as the power grid. To ensure minimum transient current from the power grid, the angle difference between the solar microinverter output voltage and the power grid voltage may ideally be zero (0).

Figure 5:
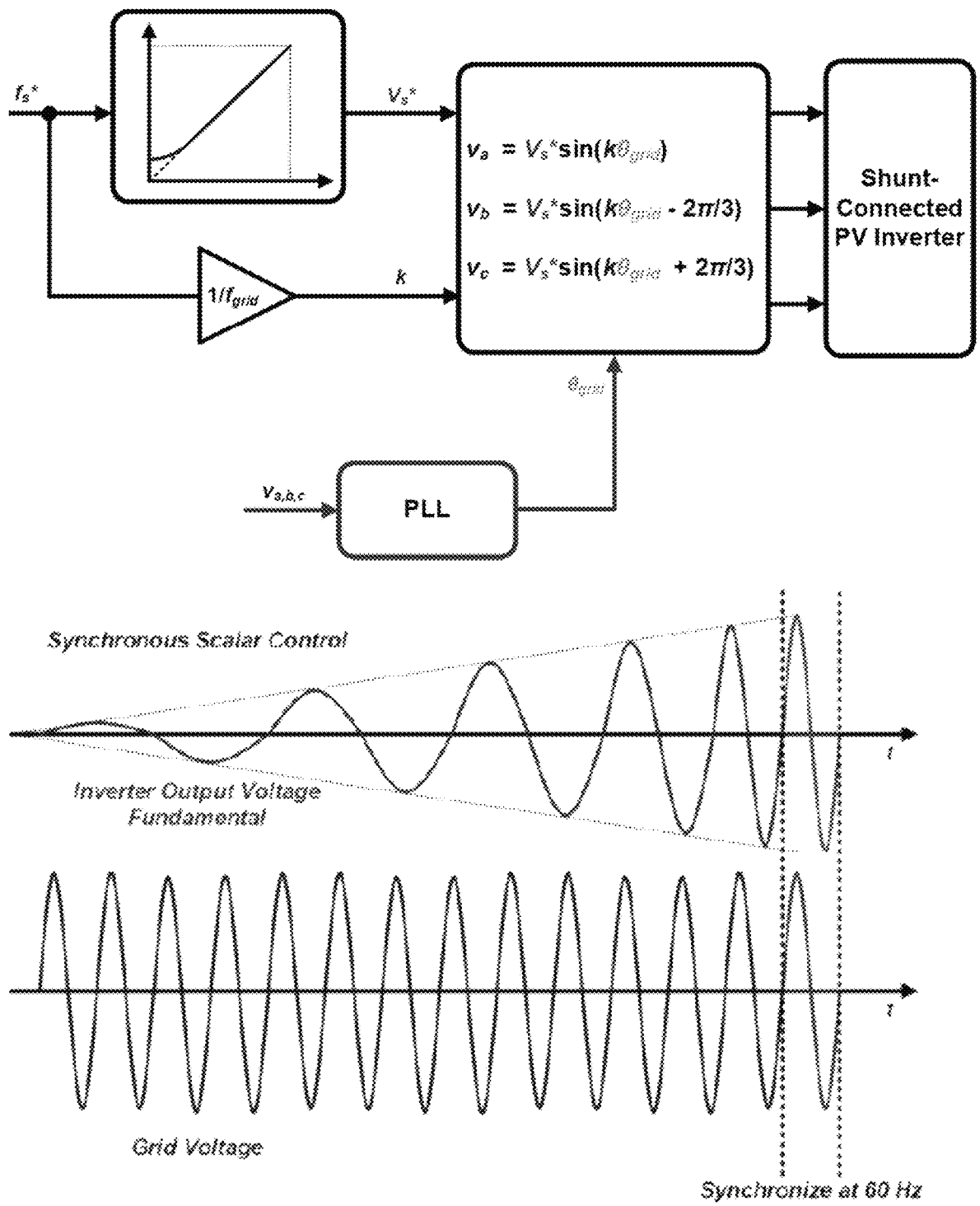
FIG. 5 depicts a controller diagram for a scalar control technique with grid synchronization and an associated synchronization of solar microinverter output voltage with grid voltage.

To provide synchronization of the grid and solar microinverter output voltage, a synchronous scalar control technique may be employed in which the frequency of one or more of the three-phase output voltage commands, parameters, instructions or otherwise indications (command) to the solar microinverter (i.e., voltage commands for AC voltages $v_a$, $v_b$, $v_c$) may be calculated using the power grid angle and expressed as:

$$\theta_{grid} = 2\pi f_{grid} t$$

$$v_a = V_s^* \times \sin(k \times \theta_{grid})$$

$$v_b = V_s^* \times \sin(k \times \theta_{grid} + 2\pi/3)$$

$$v_c = V_s^* \times \sin(k \times \theta_{grid} - 2\pi/3)$$

$$k = f_s^* / f_{grid}$$

where $\theta_{grid}$ is the power grid angle, and a phase locked loop (PLL) is fed power grid voltages $v_{a,b,c}$ to determine and/or estimate $\theta_{grid}$, t is time, $f_{grid}$ is the power grid frequency, $f_s^*$ is the frequency input as a command for the V/Hz control, and $V_s^*$ is the calculated solar microinverter output voltage command. A coefficient associated with the V/Hz slope may be selected based upon the indication motor size, voltage, etc. Since the estimated grid angle is directly used to calculate the solar microinverter output voltage, the final output of the synchronous scalar control technique may be synchronized with the power grid output voltage in its magnitude frequency, and angle, when k is equal to 1. During the soft-starting process and associated scalar control, k can begin at an initial value $0 < k_o < 1$ and then ramp or otherwise be gradually changed to a final value $k_f = 1$. Upon synchronization of the solar microinverter output with the power grid (e.g., when k=1 at its final value), the SPS may transition from the soft-starting process (e.g., disengaging the solar microinverter) to continuous operation via the power grid. FIG. 5 depicts the controller diagram for a scalar control technique with grid synchronization, including the synchronization of solar microinverter output voltage with power grid voltage at 60 Hz.

EXAMPLES

The following examples illustrate the disclosed systems and methods, but are not intended to limit the scope of any claims thereto.

Simulated Results

Example 1

Figure 6:
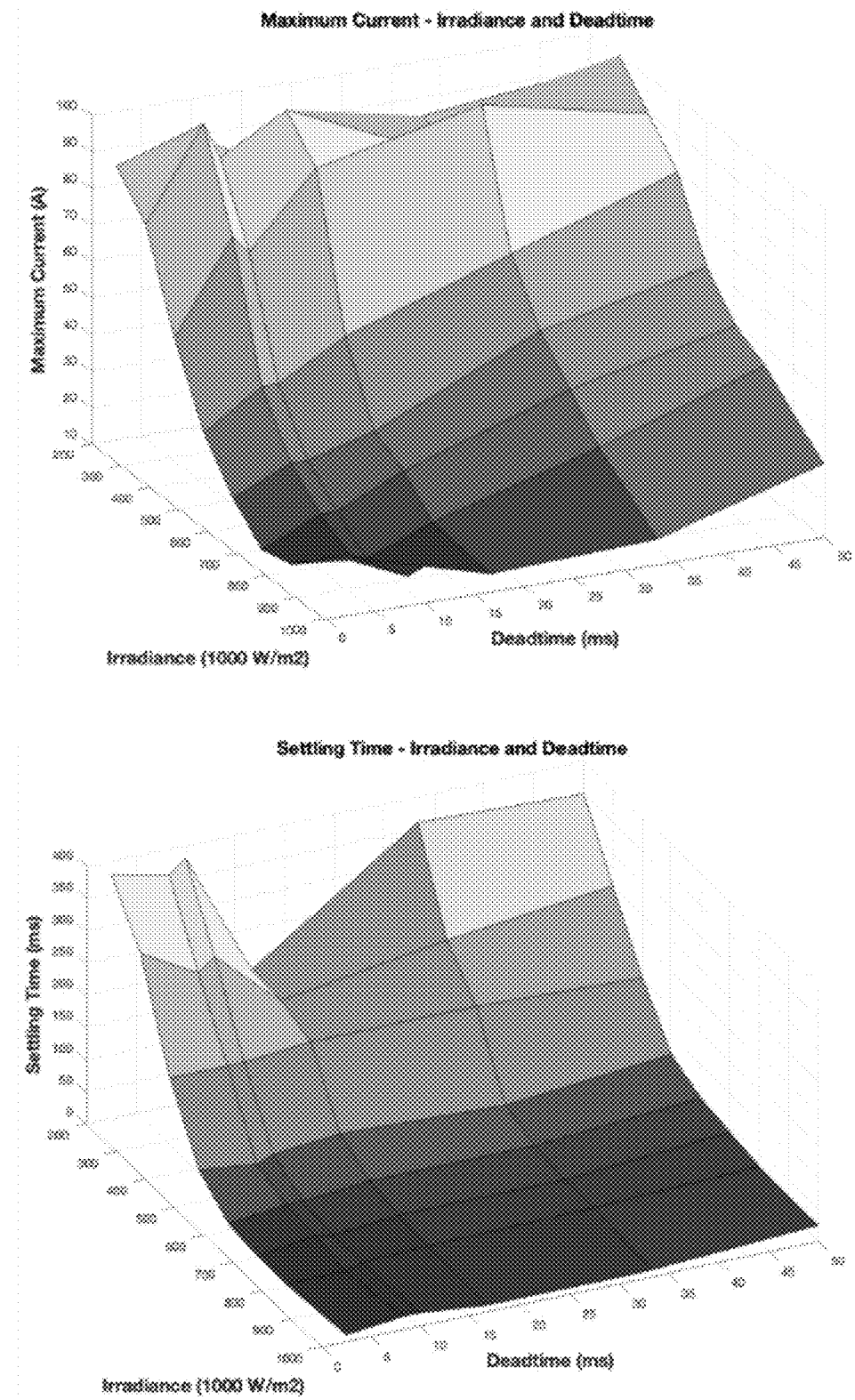
FIG. 6 graphically depicts maximum current and settling time of a three-phase power grid at various deadtimes and irradiances, according to an example.

Example 1 represents a simulation of deadtime between modes of operation of the SPS. To provide a smooth transition between different modes of operation (e.g., between mode 1 and mode 2), and to avoid potential issues such as transient currents and short-circuits, the deadtime in the relay configuration of the SPS may be optimized. A simulated parametric analysis is depicted in FIG. 6, considering various irradiances ranging from 200 to 1,000 watts per square meter (W/m$^2$), as well as different deadtimes ranging from 0 ms to 50 ms. The analysis aimed to quantify the maximum current and setting time of the input current for the induction motor. The simulation provides that the maximum transient current decreases with lower deadtimes and higher irradiances. The settling time of the system is primarily influenced by the solar irradiance, and demonstrates limited sensitivity to changes in the deadtime. A typical switching time of a mechanical relay may falls within the range of 10 ms to 20 ms, such that the optimal achievable deadtime for a delta-connected relay configuration, as described herein, may be between 10 ms to 20 ms. This deadtime selection may provide that the SPS achieves a minimal peak transient current of 10 A to 20 A and settles within a time frame of less than 30 ms when the solar irradiance exceeds 500 W/m2. The simulation confirms that operators (or other controllers) of an irrigation system may effectively utilize the proposed shunt-connected solar microinverter for reducing the starting current within a substantial time window of over 12 hours, for example, between 6 am to 6 pm.

Example 2

Example 2 represents a simulation of a starting current evaluation and deadtime effect. The proposed shunt-connected solar microinverter, a delta-connected relay configuration, and three-phase power grid system are modeled and simulated via MATLAB Simulink. In the initial analysis, the solar microinverter supplies 1 per unit (p.u.) output power to the induction motor during mode 2, resulting in a soft-start with a starting current of less than 25 A. The aforementioned synchronous scalar control technique provides that the stator current and machine torque remain relatively constant, while the machine speed linearly increases until reaching its rated value of 1,750 rpm.

The transition from mode 2 to mode 3 is facilitated with a 10 ms deadtime, and the maximum transient current drawn from the power grid is below 20 A. Notably, the peak overshoot in the transition current is approximately five times lower than the typical starting current of a line-connected induction motor, which exceeds 90 A.

Experimental Results

The experimental SPS specifications are indicated in Table 1

TABLE 1

EXPERIMENTAL SETUP SPECIFICATIONS

| Parameters | Units | Value |
| --- | --- | --- |
| Rated power | W | 200 |
| Rated voltage | Vrms | 20 |
| Max speed | RPM | 4,000 |
| Number of poles | — | 4 |
| Rotor moment of inertia | Kg · m2 | 5.89 × 10$^{-5}$ |
| Resistance (L-L) | Ω | 0.32 |
| Grid voltage | Vrms | 20 |
| Grid frequency | Hz | 60 |
| Inverter DC-link Voltage | V | 25 |
| Inverter Power Rating | W | 500 |

The synchronous scalar control method (i.e., V/Hz) is implemented in the MATLAB Simulink and autocode generation loads the code on the target digital signal processor (DSP). For the solar microinverter, a three-phase machine drive KiT (TMS320F28335 control-CARD and TI-DRV8301-HC-C2 KIT) is used. The induction motor and the dynamometer is rated at 200 W for lab-scale testing and demonstration. For the power grid, a three-phase grid simulator model 9410 from NHR is used. The selected mechanical relays are rated at a phase voltage of 240 Vrms for retrofitting to an existing line-connected system. The mechanical relays input signals are provided by a four-channel optically-isolated solid-state relay (SSR), which serve as an interface between the DSP and the delta-connected relays.

Example 3

Figure 7A:
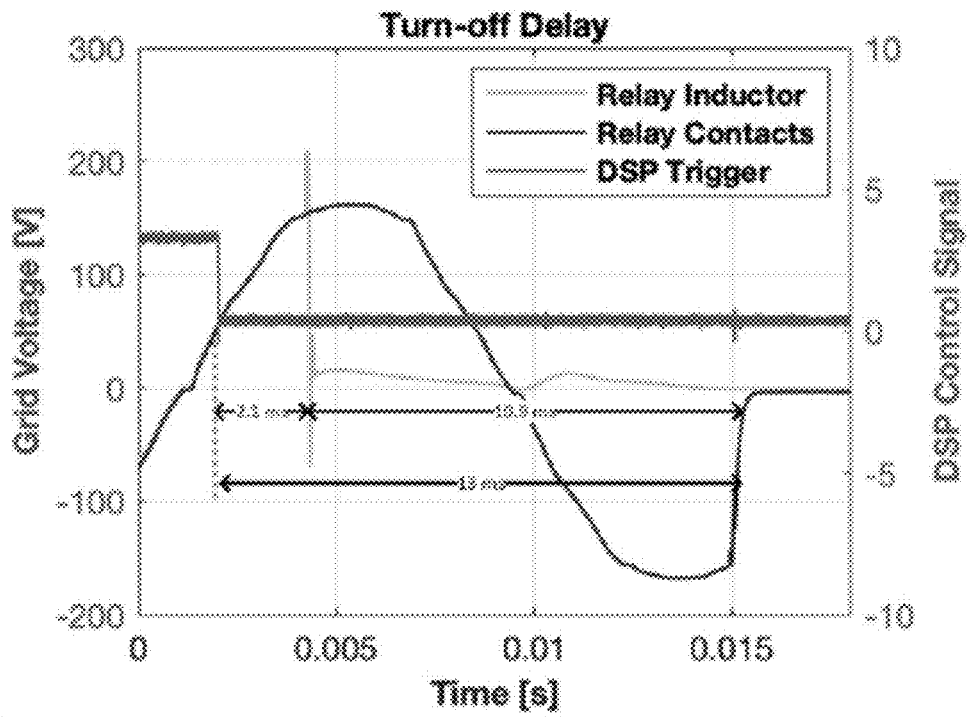
FIGS. 7A and 7B graphically depict DSP to relay turn-off and turn-on delay, respectively, according to an example.
Figure 7B:
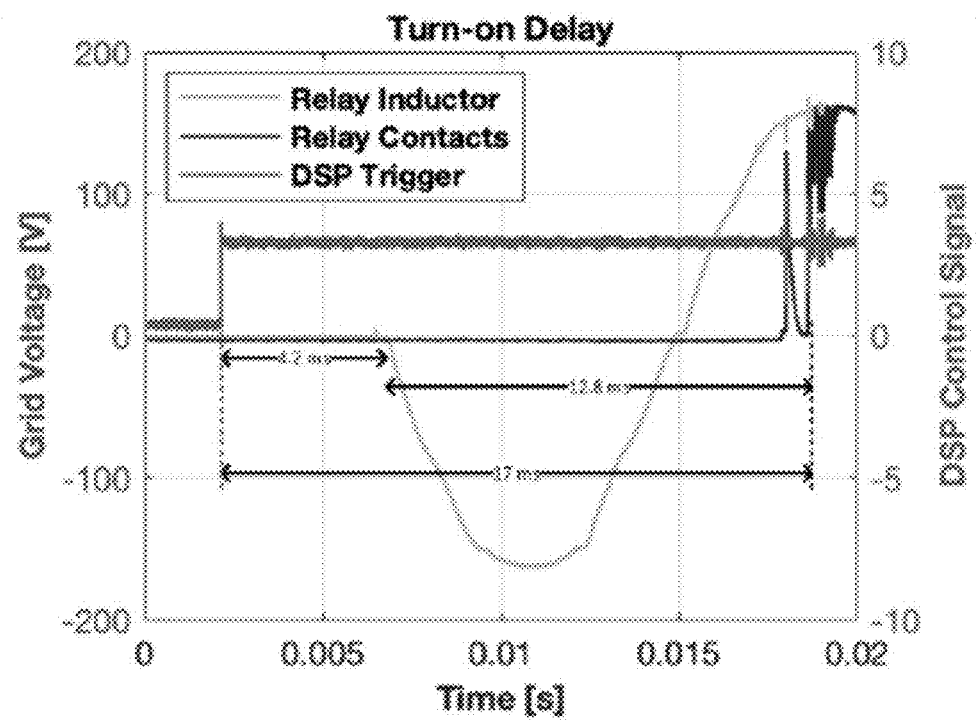

Example 3 represents a deadtime estimation of mechanical relays. To provide minimum transient and settling time operation of the proposed solar microinverter, the switching speed of the relays is measured for determining the turn-on and turn-off time. The total deadtime of the delta-connected relay in the solar microinverter system depends on the turn-off time of the relay SW-C, i.e., the relay between the solar microinverter and the induction motor (e.g., relay 270C of FIG. 2B), and the turn-on time of the relay SW-B, i.e., the relay between the grid and the induction motor (e.g., relay 270B of FIG. 2B). The total deadtime is less than 20 ms, as shown in FIGS. 7A and 7B. The total turn-off delay of the selected mechanical relay is measured to be 13 ms, which includes the delay between the DSP signal and the relay inductor, and the relay inductor and the actual relay contactor turn-off. The total turn-on delay of the selected mechanical relay is measured to be 17 ms, which includes the delay between the DSP signal and the relay inductor, and the relay inductor and the actual relay contactor turn-off. This indicates that the total deadtime between the mode change can be as low as 17 ms if the turn-on and turn-off commands are sent sequentially. Although this deadtime is still within the optimal deadtime range between 10 ms to 20 ms, the deadtime can be further reduced by overlapping the turn-off and the turn-on commands while avoiding the short-circuit of both relays.

Example 4

Example 4 represents a line-started induction motor and starting current. The experimental setup is a scaled down version of irrigation pumps, which are generally sized over 20 hp, and as such the motor starting and rated current with fixed grid frequency are different from large induction motors. To compare the starting current with and without the proposed shunt-connected solar microinverter, the induction motor starting current without the solar microinverter is first measured with the 200 W IM and 20 Vrms grid voltage at 60 Hz.

The induction motor with stationary rotor behaves like a transformer with shorted secondary winding. There is no back-emf to counter the emf in the stator windings, so a substantially high current flows through both stator and rotor windings. As the rotor speeds increase up to the rated rpm, the generated back-emf from the rotor causes the stator current to fall. The grid voltage and stator/grid current are monitored during the line starting process. The stator current surges to 16.5 A during the first five electrical cycles and after 0.1 second the induction reaches to steady-state. It is also important to indicate that the grid voltage drops by 30% as the induction motor draws high starting current, which was also observed in the field measurements.

Example 5

Example 5 represents a synchronous scalar control for soft-starting and grid synchronization. The proposed synchronous scalar control technique is implemented in MATLAB Simulink and autocode generation is used to convert the model to the target DSP code. The generated code is used to soft-start the induction motor to validate two objectives: (1) soft-starting and (2) grid synchronization in rated condition. The solar microinverter with the synchronous scalar control technique generates variable frequency and pulse width output voltage. The solar microinverter maintains the induction motor stator current peak current less than 20 A during the motor acceleration period with the scalar control. This may ensure minimum peak current induction motor soft-starting with the solar microinverter and the synchronous scalar control. When the induction motor reaches its rated speed, the system is suitably monitored to determine whether or confirm that the solar microinverter output voltage is synchronized with the grid voltage for minimum grid transient current. Monitoring of phase A of both the solar microinverter output voltage and the grid voltage confirms that both waveforms are synchronized.

Example 6

Example 6 represents a demonstration of soft-starting and mode transition. The final demonstration includes the soft-starting of the induction motor and the transition of the operation from mode 2 to mode 3. The induction motor stator voltage and current are monitored for the full test, which takes approximately 9 s. The proposed synchronous scalar control technique is used to soft-start the induction motor using solar energy. The soft-starting technique regulates the induction motor stator current less than 15 A during the whole acceleration process. When the induction motor reaches its rated speed of 1,750 rpm, one of three mechanical relays connecting the solar microinverter with the induction motor is turned off at approximately 7.955 s. After 30 ms of the deadtime, the power grid is engaged with the turn-on of the grid-side mechanical relay continuing the induction motor operation. The measured grid current shows the peak current less than 15 A and the settling time of less than two electrical cycles. Compared to the line-starting induction motor operation where the peak current is over 15 A with more than five electrical cycles of the settling time, the proposed solar microinverter with soft-starting technique may effectively mitigate the induction motor starting current and settling time.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A solar power system for induction motor soft-starting and power compensation, the system comprising:
    an induction motor;
    a solar microinverter adapted to provide an AC power output from incident solar radiation, the AC power output comprising photovoltaic reactive power ($Q_{PV}$) and optionally photovoltaic active power ($P_{PV}$); and
    a relay system electrically coupled to the induction motor, the solar microinverter, and a power grid access point adapted to provide an AC power comprising grid reactive power ($Q_G$) and grid active power ($P_G$), wherein the relay system is adapted to operate in at least a first state, a second state, a third state, and optionally a fourth state in which:
        in the first state of the relay system, the induction motor and the solar microinverter are in electrical connection, the induction motor and the power grid access point are in electrical isolation, and the solar microinverter and the power grid access point are in electrical isolation;
        in the second state of the relay system, the induction motor, the solar microinverter, and the power grid access point are in electrical connection with each other;
        in the third state of the relay system, the induction motor and the solar microinverter are in electrical isolation, the induction motor and the power grid access point are in electrical isolation, and the solar microinverter and the power grid access point are in electrical connection; and in the fourth state of the relay system, the induction motor, the solar microinverter, and the power grid access point are in electrical isolation with each other.

2. The system of claim 1, wherein the relay system is adapted to operate in the fourth state.

3. The system of claim 1, wherein the induction motor is coupled to a machine selected from the group consisting of pumps, HVAC (heating, ventilation, air conditioning) systems or components thereof, dryers, fans, and combinations thereof.

4. The system of claim 1, wherein the induction motor is coupled to a pump coupled to an agricultural irrigation system.

5. The system of claim 1, wherein the induction motor has power rating in a range of about 3.7 kW to 45 kW.

6. The system of claim 1, wherein the solar microinverter comprises:
   one or more photovoltaic (PV) cells adapted to provide a DC output power of about 3 kW; and
   a microinverter adapted to provide an AC output power of about 5 kVA.

7. The system of claim 1, wherein the relay system comprises:
   a point of common coupling (PCC) to which each of the induction motor, solar microinverter, and the power grid access point are electrically coupled;
   a first switch electrically coupled to the PCC and the induction motor such that (i) the PCC and the induction motor are in electrical connection when the first switch is closed, and (ii) the PCC and the induction motor are electrically isolated when the first switch is open;
   a second switch electrically coupled to the PCC and the power grid access point such that (i) the PCC and the power grid access point are in electrical connection when the second switch is closed, and (ii) the PCC and the power grid access point are electrically isolated when the second switch is open; and
   optionally a third switch electrically coupled to the PCC and the solar microinverter such that (i) the PCC and the solar microinverter are in electrical connection when the third switch is closed, and (ii) the PCC and the solar microinverter are electrically isolated when the third switch is open.

8. The system of claim 1, wherein the relay system comprises:
   a first switch electrically coupled to the solar microinverter and the induction motor such that (i) the solar microinverter and the induction motor are in electrical connection when the first switch is closed, and (ii) the solar microinverter and the induction motor are electrically isolated when the first switch is open;
   a second switch electrically coupled to the induction motor and the power grid access point such that (i) the induction motor and the power grid access point are in electrical connection when the second switch is closed, and (ii) the induction motor and the power grid access point are electrically isolated when the second switch is open; and
   a third switch electrically coupled to the power grid access point and the solar microinverter such that (i) the power grid access point and the solar microinverter are in electrical connection when the third switch is closed, and (ii) the power grid access point and the solar microinverter are electrically isolated when the third switch is open.

9. The system of claim 1, further comprising a computer system in electronic communication with one or more of the induction motor, the solar microinverter, and the relay system, the computer system being adapted to control and/or monitor operation of the induction motor, the solar microinverter, and/or the relay system.

10. A method of operating a solar power system, the method comprising:
    operating the solar power system of claim 1 with the relay system in the second state to power the induction motor, such that (i) at least some reactive power required by the induction motor is provided by the solar microinverter, and (ii) active power required by the induction motor is provided by the solar microinverter and through the power grid access point combined.

11. The method of claim 10, wherein all reactive power required by the induction motor is provided by the solar microinverter.

12. The method of claim 11, wherein at least some active power required by the induction motor is provided by the solar microinverter.

13. The method of claim 10, further comprising, prior to operating the solar power system with the relay system in the second state:
    operating the solar power system with the relay system in the first state to perform a soft-start process for the induction motor, the soft-start process comprising:
       operating the operating the solar power system with the relay system in the first state with the solar microinverter providing reactive power and active power to the induction motor to engage the induction motor.

14. The method of claim 13, wherein, prior to operating the solar power system with the relay system in the first state, the induction motor is in a stationary state.

15. The method of claim 13, wherein operating the solar power system with the relay system in the first state comprises performing a V/Hz control process for power provided by the solar microinverter to the induction motor, the V/Hz control process comprising:
    ramping a voltage of the power provided by the solar microinverter from zero to a selected setpoint voltage;
    ramping a frequency of the power provided by the solar microinverter from zero to a selected setpoint frequency; and
    synchronizing the power provided by the solar microinverter with power provided through the power grid access point.

16. The method of claim 15, wherein synchronizing the power provided by the solar microinverter with power provided through the power grid access point further comprises:
    calculating a frequency of three-phase output voltages using the grid voltage expressed as:

$$\theta_{grid} = 2\pi f_{grid} t$$

$$v_a = V_s^* \times \sin(k \times \theta_{grid})$$

$$v_b = V_s^* \times \sin(k \times \theta_{grid} + 2\pi/3)$$

$$v_c = V_s^* \times \sin(k \times \theta_{grid} - 2\pi/3)$$

$$k = f_s^* / \theta_{grid}$$

wherein $\theta_{grid}$ is a power grid angle estimated through a phase locked loop, t is time, $f_{grid}$ is a power grid frequency, $f_s^*$ is an input command frequency, and $V_s^*$ is a calculated solar microinverter output voltage command.

17. The method of claim 13, wherein the soft-start process further comprises disengaging the solar microinverter (i) after operating the solar power system with the relay system in the first state and (ii) before operating the solar power system with the relay system in the second state.

18. The method of claim 13, wherein:
- the induction motor is coupled to a pump coupled to an agricultural irrigation system; and
- a peak pressure in a fluid irrigation line of the agricultural irrigation system is reduced relative to a corresponding peak pressure resulting from direct on-line starting of the induction motor from the power grid access point.

19. The method of claim 13, wherein:
- a peak current in one or more of rotor current, stator current, and PV inverter current is reduced relative to a corresponding peak current resulting from direct on-line starting of the induction motor from the power grid access point.

20. The method of claim 10, further comprising, after operating the solar power system with the relay system in the second state:
- operating the solar power system with the relay system in the third state, thereby providing power from the solar microinverter to a power grid through the power grid access point.

21. A method of operating a solar power system, the method comprising:
- operating the solar power system of claim 1 with the relay system in the third state to provide power from the solar microinverter to a power grid through the power grid access point.

* * * * *